United States Patent
Burger et al.

(10) Patent No.: US 8,951,628 B2
(45) Date of Patent: *Feb. 10, 2015

(54) POLYMER COATINGS COMPRISING A COMPLEX OF AN IONIC FLUOROPOLYETHER AND A COUNTER IONIC AGENT

(75) Inventors: Wolfgang Burger, Burgrain (DE); Rudolf Steffl, Oy-Mittelberg (DE)

(73) Assignee: W.L. Gore & Associates, GmbH, Putzbrunn (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/054,101

(22) PCT Filed: Jul. 15, 2009

(86) PCT No.: PCT/EP2009/005148
§ 371 (c)(1),
(2), (4) Date: Mar. 16, 2011

(87) PCT Pub. No.: WO2010/006783
PCT Pub. Date: Jan. 21, 2010

(65) Prior Publication Data
US 2011/0171458 A1 Jul. 14, 2011

(30) Foreign Application Priority Data
Jul. 17, 2008 (EP) .................................. 08012949

(51) Int. Cl.
*B32B 27/00* (2006.01)
*C08J 7/16* (2006.01)
(Continued)

(52) U.S. Cl.
CPC . *C08J 7/16* (2013.01); *B32B 27/12* (2013.01); *B82Y 30/00* (2013.01); *C08G 65/007* (2013.01);
(Continued)

(58) Field of Classification Search
USPC .......... 428/319.3, 319.7, 421, 422; 525/326.2
See application file for complete search history.

(56) References Cited

U.S. PATENT DOCUMENTS

| 3,953,566 A | 4/1976 | Gore et al. |
| 4,194,041 A | 3/1980 | Gore et al. |

(Continued)

FOREIGN PATENT DOCUMENTS

| DE | 3832828 | 4/1990 |
| EP | 433070 | 6/1991 |

(Continued)

OTHER PUBLICATIONS

Fuchs, A.D. and J. C. Tiller, Angew Chem 2006, 118, 6911-6914.
(Continued)

*Primary Examiner* — Hai Vo
(74) *Attorney, Agent, or Firm* — Amy L. Miller

(57) ABSTRACT

The present invention relates to an article comprising a polymeric substrate and a coating thereon comprising a complex of an ionic fluoropolyether and a counter-ionic agent, to a process for the production of a coating on a polymeric substrate comprising the steps of a) preparing a mixture of an ionic fluoropolyether or a precursor thereof and a counter-ionic agent of a precursor thereof and b) applying the mixture prepared in step a) onto the substrate, to the use of such articles for the manufacture of a garment, a filter element, a venting element or a protective enclosure, to the use of a coating composition comprising a complex of an ionic fluoropolyether and a counter-ionic agent for coating of a polymeric substrate, and to the use of a coating composition comprising a complex of an ionic fluoropolyether and a counter-ionic agent as an antimicrobial or antifungal coating of a substrate.

13 Claims, 3 Drawing Sheets

Figure 1A:
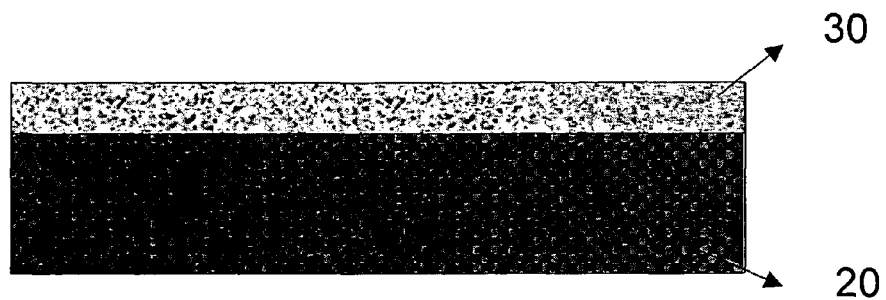

(51) Int. Cl.
  *B32B 27/12* (2006.01)
  *B82Y 30/00* (2011.01)
  *C08G 65/00* (2006.01)
  *C08J 7/04* (2006.01)
  *C09D 171/02* (2006.01)

(52) U.S. Cl.
  CPC ............... *C08J 7/047* (2013.01); *C09D 171/02* (2013.01); *B32B 2307/71* (2013.01); *B32B 2307/7145* (2013.01); *B32B 2307/724* (2013.01); *C08J 2327/12* (2013.01); *C08G 2650/48* (2013.01); *C08J 2327/00* (2013.01); *C08J 2471/00* (2013.01)
  USPC ..................... 428/319.3; 428/319.7; 428/421; 428/422; 525/326.2

(56) References Cited

U.S. PATENT DOCUMENTS

| | | | |
|---|---|---|---|
| 4,598,011 | A | 7/1986 | Bowman |
| 4,745,009 | A | 5/1988 | Piacenti et al. |
| 5,476,589 | A | 12/1995 | Bacino |
| 5,540,837 | A | 7/1996 | Lunkwitz et al. |
| 5,716,680 | A | 2/1998 | Martin et al. |
| 5,985,308 | A | 11/1999 | Burrell et al. |
| 5,993,907 | A * | 11/1999 | Aikman, Jr. ............... 427/341 |
| 6,074,738 | A | 6/2000 | von Fragstein et al. |
| 6,140,436 | A | 10/2000 | Doyle et al. |
| 6,361,870 | B1 | 3/2002 | Steffl et al. |
| 6,638,622 | B2 | 10/2003 | Dai et al. |
| 6,916,955 | B2 | 7/2005 | Dai et al. |
| 6,940,692 | B2 | 9/2005 | Dai et al. |
| 7,094,851 | B2 | 8/2006 | Wu et al. |
| 2003/0139521 | A1 * | 7/2003 | Linert et al. ............... 524/507 |
| 2003/0175523 | A1 * | 9/2003 | Moya ............... 428/421 |
| 2004/0024123 | A1 * | 2/2004 | Moya ............... 525/72 |
| 2004/0222413 | A1 | 11/2004 | Hsu et al. |
| 2005/0112969 | A1 | 5/2005 | Snowden et al. |
| 2005/0287111 | A1 | 12/2005 | Schlenoff et al. |
| 2006/0266642 | A1 | 11/2006 | Akle et al. |
| 2008/0020208 | A1 | 1/2008 | Lee et al. |

FOREIGN PATENT DOCUMENTS

| | | |
|---|---|---|
| EP | 615 779 | 9/1994 |
| FR | 2024291 | 8/1970 |
| KR | 1999-44472 | 6/1999 |
| WO | 96/07529 | 3/1996 |
| WO | 03040247 | 5/2003 |
| WO | 2007/0258293 | 3/2007 |

OTHER PUBLICATIONS

Kirchmeyer, S., K. Reuter in J. Mater. Chem., 2005, 15, 2077-2088.
Morton, H. E., Pseudomonas in Disinfection, Sterilization and Preservation, ed. S.S. Block, Lea and Febinger, 1977.
Miyake, Haruhisa, "Fluorine-containing ion-exchange membranes for manufacture of sodium hydroxide" 45, 110-16 Coden: KGSOBF, 1984.
Scheirs, John, "Modern Fluoropolymers" Wiley Series in Polymer Science, John Wiley & Sons (Chichester, New York, Wienheim, Brisbane, Singapore, Toronto), Chapter 24: Perfluoropolyethers (Synthesis, Characterization and Applications.
Wieder, H.H., "Laboratory Notes on Electrical Galvanomagnetc Measurements,Chapter 1 p. 1ff; Chapter 1.3 pp. 11-16; Chapter 1.4 pp. 16-21" Elsevier Scientific Publishing Co., New York (1979).
International Search Report PCT/EP2009/005148—WO2010/006783 Jan. 21, 2010, 4 pages.
International Search Report PCT/EP2009/005149—WO2010/006784 Jan. 21, 2010, 4 pages.
International Search Report PCT/EP2009/005147—WO2010/006782 Jan. 21, 2010, 4 pages.

* cited by examiner 30
20

30
20

POLYMER COATINGS COMPRISING A COMPLEX OF AN IONIC FLUOROPOLYETHER AND A COUNTER IONIC AGENT

The invention relates to an article comprising a substrate and a coating thereon comprising an ionic fluoropolyether and a counter-ionic agent. The invention further relates to a process for the production of such a coating and to the use of a mixture of an ionic fluoropolyether and a counter-ionic agent for the preparation of a coating.

Polymers today are used in a broad range of applications, including garments, filters, and membranes in different fields of technology. The different applications more and more require properties which are not inherent to the polymers, and can hence only be provided by a functionalisation, in particular of the polymer surface.

One way to functionalise polymeric surfaces is to coat the surface with a (usually thin) layer of a functionalising agent. By doing this, properties such as water-tightness, resistance against chemicals, fire retardance and the like can be imparted to the polymer. However, most concepts and coatings so far have focused on the improvement of a specific property, but do not allow to impart a variety of desirable properties to the substrate and to fine-tune and balance them.

For example, applying a polyester or polyurethane coating as a layer on the outer surface of an expanded polytetrafluoroethylene (ePTFE) substrate improves the resistance against chemicals such as contained in sun lotions, sweat, body fats, makeup and the like (U.S. Pat. No. 4,194,041 and U.S. Pat. No. 6,074,738). However, such coatings cannot be generally used for optimization of other important properties such as fire retardance, hydrophilicity or the like. Furthermore, coatings based on non-ionic perfluoropolyethers have been used to modify the oleophobicity of microporous polymer substrates, as disclosed in EP 615 779.

It is a further requirement for a coating agent that it must have a good adherence to the substrate in order to functionalise it permanently, and that it should not or only to a small degree adversely affect the desired inherent properties of the polymer. For example, in the case of a microporous polytetrafluoroethylene (PTFE) membrane used for filtration a coating must not be easily washed off and it should not impair the fluid flow through the pores.

Furthermore, based on the inertness and low surface energy of many substrates, especially fluorinated polymer substrates, it is known that it is very difficult to coat the surfaces of those substrates, e.g. microporous ePTFE, with ionic or charged species. The poor adhesion of those substrates to ionic or charged species leads to failure in many industrial applications. This means that without any chemical surface treatment like etching, radiation, laser treatment, plasma activation and/or supercritical $CO_2$ pretreatment, there is usually no way to coat directly and permanently polyions like intrinsically conductive polymers, metal ions, organic ions, charged particulates, salts and others onto these surfaces. However, especially those compounds could be expected to impart special properties if coated to a substrate.

Still further, these methods devoted directly to the surface modification like etching, plasma or corona treatment, irradiation etc., which have been developed to improve their adhesion ability, are destructive for the substrate and go along with surface defluorination and weakening of the mechanical strength of the fluoropolymer substrate. If the substrate is thin, the mechanical strength of the substrate can even decrease to such an extent that the substrate is not sustainable under surface modification conditions.

U.S. Pat. No. 6,638,622, U.S. Pat. No. 6,940,692 and U.S. Pat. No. 6,916,955 describe a process for synthesizing sodium salts of a perfluoropolyether containing carboxylic acid groups and the application of these salts as a coating to protect magnetic recording disks and magnetic recording heads from corrosion. These coatings have especially been designed to provide very good adhesion to metal and metal oxide surfaces with their high surface energy. The coatings have a maximum thickness of 10 nm and provide the surface with extremely water repellent properties similar to a dense PTFE coated surface.

It is an object of the invention to provide articles comprising polymeric substrates and a coating which allows to impart a wide variety of properties to the substrate and allows to tailor those properties. Simultaneously, the coating should have good adhesion to the substrate, should be easily preparable and applicable, and should be evenly and homogeneously distributable on the substrate.

It is a further object to provide coatings comprising ionic or charged species on substrates normally difficult to coat with these substances.

It has now surprisingly been found that these objects can be achieved by coating a polymeric substrate with a composition comprising two components—an ionic fluoropolyether, i.e. a fluoropolyether which comprises ionic groups, and a counter ionic agent bearing ionic charges opposite to that of the ionic groups of the fluoropolyether—in the form of a complex.

The present invention therefore provides an article comprising a polymeric substrate and a coating thereon comprising a complex of an ionic fluoropolyether and a counter-ionic agent.

The coating concept of the present invention including the two components ionic fluoropolyether and counter-ionic agent provides, on the one hand, for excellent film forming properties and adhesion of the coating on a polymeric substrate mainly based on the properties of the complexed ionic fluoropolyether in the coating. On the other hand, the concept simultaneously allows for the improvement and tailoring of a variety of different properties of the substrate, because a wide variety of counter-ionic agents may be used for complex formation, and its ratio with regard to the ionic groups in the fluoropolyether can be varied. In any case, it is the synergistic effects of interaction of the substrate and the complex contained in the coating which makes the article of the invention unique.

The article according to the invention allows the provision of improved properties. It has surprisingly been found that a huge variety of different properties of the substrate can be improved and taylored applying the present invention.

As examples for the properties of a polymeric substrate which can be improved and fine tuned can be mentioned the heat and flame protection, antistatic properties, hydrophilicity, hydrophobicity, oleophobicity and antimicrobial properties.

When (micro-)porous polymeric substrates are used such as, e.g., expanded PTFE (ePTFE) the flow properties can be tailored to provide an unique balance of oil rating and at the same time wettability by electrolytes such as water.

Furthermore, for coatings of the inner pore surface of (micro-)porous substrates it is advantageous that the coatings of the invention form smoothly and evenly so that pores are not blocked. This advantage is especially given compared to prior art concepts which have used small particles in order to modify properties of the substrate. The advantage of the invention is represented in high flow-through rate for air and liquids for porous materials. For monolithic coatings, i.e.

layers on the outer surface of a substrate, the absence of particulates allows the formation of ultra-thin coatings.

Still further, the combination of counter-ionic agent and ionic fluoropolyether, and the complex formation between those components, leads to insoluble, durable coatings, especially as a thin layer at the surface of fluoropolymers. This, in turn, means that the invention allows the durable bonding of ionic species to fluoropolymer surfaces.

As no pre-treatment of the substrate is necessary before coating, the invention allows for the functionalization of the substrate in a non-degrading way. Very thin membranes may thus be provided with additional functionalities without a loss of mechanical properties.

The articles of the invention moreover may be provided with enhanced moisture vapor transmission rates (MVTR) and, at the same time, water impermeability, excellent resistance against chemicals, excellent UV-degradation resistance and mechanical stability. The articles may furthermore have an improved balance of permeability and MVTR values.

Articles according to the invention may be used in garments such as in garments for protection, comfort and functionality, in textile structures, in laminates, in filter elements such as for filtration or microfiltration of liquids and/or gases, in venting elements such as for venting of vessels and containers, in sensors, in diagnostic devices, in protective enclosures, and in separation elements.

The polymeric substrate used in the article of the invention may be any kind of polymer such as synthetic, natural polymers and/or composites of synthetic and/or natural polymers.

The substrate can be a membrane, a textile or a laminate. The substrate may be woven, non-woven, felt or knit. The substrate may be also fibres such as monofilaments, multifilaments, or yarns, including microdenier fibers and yarns.

Polymeric substrates are known to have a low surface energy, in contrast e.g. to metals or metal oxides. The polymeric substrate of the article of the invention in one embodiment has a surface energy of 100 mN/m or less, and in a further embodiment has a surface energy of 40 mN/m or less.

The substrate on which the coating is present in one embodiment has a thickness of 1 to 1 000 micrometer, in a further embodiment has a thickness of 3 to 500 micrometer, and in still a further embodiment has a thickness of 5 to 100 micrometer. Further layers of the same or a different material may be laminated to the coated substrate.

In one embodiment, the substrate is a fluoropolymer, i.e. a polymer which contains fluorine atoms, and in a further embodiment, the substrate is a fluoropolyolefin.

The substrate may include fillers.

The fluoropolymer may be partially fluorinated or fully fluorinated, i.e. perfluorinated.

In one embodiment, the substrate comprises, or consists of, polytetrafluoroethylene (PTFE), a modified PTFE, a fluorothermoplastic or a fluoroelastomer or any combination of these materials. The term "modified PTFE" as used herein is intended to denote a type of tetrafluoroethylene copolymer in which in addition to tetrafluoroethylene monomer units further perfluorinated, fluorinated or non-fluorinated co-monomer units are present.

In a second embodiment, the substrate consists of polytetrafluoroethylene (PTFE), a modified PTFE, a fluorothermoplastic or a fluoroelastomer or any combination of these materials.

In a further embodiment, the substrate comprises PTFE, and in still a further embodiment, the substrate consists of PTFE.

The substrate furthermore may be a porous substrate, for example porous PTFE.

The term "porous" as used herein refers to a material which has voids throughout the internal structure which form an interconnected continuous air path from one surface to the other.

The substrate may be a microporous substrate. This means that the voids of the substrate are very small and are usually referred to as "microscopic".

A suitable pore size of the voids in the microporous substrate is in the range of 0.01 to 15 micrometer as determined in the mean flow pore size measurement.

In one embodiment, the substrate comprises expanded PTFE (ePTFE, EPTFE).

In a further embodiment, the substrate consists of expanded PTFE.

PTFE may be expanded (i.e., drawn) in one or more directions to render the fluoropolymer porous. The porous fluoropolymer can be in the form of a tape, tube, fiber, sheet or membrane. The microstructure of the porous fluoropolymer can include nodes and fibrils, only fibrils, only fibril strands or bundles, or stretched nodes interconnected by fibrils.

Suitable fluoropolymer membranes include uni- or biaxially stretched polytetrafluoroethylene membranes.

A suitable expanded polytetrafluoroethylene (ePTFE) material is, e.g., the nonwoven ePTFE films disclosed by Bowman in U.S. Pat. No. 4,598,011, by Branca in WO 96/07529, by Bacino in U.S. Pat. No. 5,476,589, by Gore in U.S. Pat. No. 4,194,041 and by Gore in U.S. Pat. No. 3,953,566, the contents of which are incorporated herein by reference. The ePTFE films described therein are thin, strong, chemically inert and intrinsically can have a high flow-through rate for air or liquids.

Suitable fluoropolymers for making ePTFE films include PTFE and copolymers of tetrafluoroethylene like FEP, PFA, THV etc.

The combination of mean flow pore size and thickness determines flow rates through the membranes. For microfiltration application, acceptable flow is required with good particle retention performance. A narrow small ePTFE pore size comes with high water entry pressures. A more open ePTFE pore size would decrease the resistance of an ePTFE membrane against water entry. For these practical reasons, a mean flow pore size of ePTFE below 0.3 micrometer is considered to be good.

The term "ionic fluoropolyether" is intended to denote a polymer made from partially or perfluorinated olefinic monomer units linked by O atoms and units containing ionic groups, i.e. groups bearing an electric charge. In the ionic fluoropolyether molecules, one or more ionic groups of the same or a different nature may be present.

Ionic fluoropolyethers typically are thermally stable, substantially insoluble in water and most common solvents, and cannot be leached out after a coating application.

It is further possible to have a lubricious coating as required in many devices and fibers. Lubricious coatings may be obtained by the use of certain ionic fluoropolyether complexes with adjusted viscosity and hydrophilicity.

For example, the fluoropolyether olefinic monomer units may comprise —O—(CF$_2$—CF$_2$)—, and/or —O—(CFH—CF$_2$)—, and/or —O—(CH$_2$—CF$_2$)—, and/or —O—(CH$_2$—CHF)—, and/or —O—(CF(CH$_3$)—CF$_2$)—, and/or —O—(C(CH$_3$)$_2$—CF$_2$)—, and/or —O—(CH$_2$—CH(CH$_3$))—, and/or —O—(CF(CF$_3$)—CF$_2$)—, and/or —O—(C(CF$_3$)$_2$—CF$_2$)—, and/or —O—(CF$_2$—CH(CF$_3$))—.

The ionic groups may be anionic groups, such as —SO$_3^-$, —COO$^-$, —OPO$_3^{2-}$, and/or combinations of anionic and cationic groups, such as —SO$_3^-$, —COO$^-$, —OPO$_3^{2-}$, with —NH$_3^+$, —NR$_1$H$_2^+$ or —NR$_2$H$^+$.

In one embodiment, the ionic groups are anionic groups, and in a further embodiment the groups are selected from carboxylic, phosphoric, sulphonic groups and mixtures thereof.

Precursors of ionic fluoropolyethers are such compounds which can be transferred into fluoropolyethers having ionic groups by simple chemical reactions. For example, the precursor for an ionic fluoropolyether containing —$CO_2^-$ groups as ionic groups may be the same compound with non-ionic —$CO_2H$ groups, which may then be converted into the corresponding anionic —$CO_2^-$ groups by reaction of the precursor with the counter-ionic agent or its precursor, e.g. by reaction with magnesium acetate and heating so as to evaporate acetic acid.

In the ionic fluoropolyether, fluorine atoms are present which are covalently bonded to carbon atoms in the polymer main or side chains (branches). The term "polymer" includes copolymers, such as for example, block, graft, random and alternating copolymers as well as terpolymers, further including their derivatives, combinations and blends thereof. Furthermore, unless specifically limited, the term "polymer" shall include all geometrical configurations of the molecule including linear, block, graft, random, alternating, branched structures, and combination thereof.

In one embodiment, the ionic fluoropolyether has a high fluorine content, e.g. >50 atom % with respect to the non-carbon atoms, in order to improve the compatibility to the polymeric substrate, especially to fluorinated substrates such as PTFE.

The fluorine/hydrogen ratio, in the following F/H ratio, of the ionic fluoropolyether may be above 1, in a further embodiment is above 2, and in still a further embodiment is above 3, as the compatibility with substrates, in particular fluoropolymers, is further improved and the solubility in water is kept on a low level. Additionally, the durability of the coating is enhanced.

The F/H ratio determines, for example, the degree of swelling in wet or humid conditions. The lower the F/H ratio the higher the degree of swelling under humid conditions.

The ionic fluoropolyethers may be perfluorinated, in particular in the case of fluorinated substrates such as PTFE or ePTFE substrates.

Ionic perfluorinated polyethers usually have olefinic monomer units selected from any one of or combination of the following: —$CF_2$—O—; —($CF_2CF_2$)—O—; —(CF($CF_3$))—O—; —($CF_2CF_2CF_2$)—O—; —($CF_2CF(CF_3$))—O—; and —(CF($CF_3$)$CF_2$)—O—. Some newer types of perfluorinated polyethers may also contain other repeating units (e. g. (C($CF_3$)$_2$)—O—) or such with more than three carbon atoms: e. g. —($C_4F_8$)—O—; or —($C_6F_{12}$)—O—.

In one embodiment, the ionic fluoropolyether is selected from the group of ionic perfluoropolyalkylethers, i.e. perfluoropolyalkylethers having one or more ionic groups in the molecule. Perfluoropolyalkylethers are usually abbreviated as "PFPE". Other synonymous terms frequently used include, "PFPE oil", "PFPE fluid" and "PFPAE".

In the art, PFPEs are known which have only neutral, non-ionic groups, especially non-ionic end groups.

A general description of such perfluorinated polyethers is found in the book "Modern Fluoropolymers", edited by John Scheirs, Wiley Series in Polymer Science, John Wiley & Sons (Chichester, N.Y., Wienheim, Brisbane, Singapore, Toronto), 1997, Chapter 24: Perfluoropolyethers (Synthesis, Characterization and Applications), which is incorporated herein by reference.

However, ionic fluoropolyethers, including ionic PFPEs as used in the present invention, differ from such neutral PFPE in that they comprise ionic groups.

The ionic fluoropolyether molecule usually comprises two end-groups at opposite ends of the backbone of the ionic fluoropolyether structure.

Typically, the ionic groups present in the ionic fluoropolyether molecule constitute, or are attached to, those end groups.

The ionic fluoropolyether may thus have been obtained by modifying non-ionic fluoropolyether by end group reactions. Such compounds are commercially available, for example, the compounds sold under the trade name Fluorolink® (Solvay Solexis).

Embodiments of ionic fluoropolyethers, or precursors thereof, are:

(a) a perfluoro polyether (PFPE), said PFPE comprising end-groups selected from the following:

—$(O)_n$—$(CR_1R_2)_m$—X wherein:
$R_1$=H, F, Cl, Br or I;
$R_2$=H, F, Cl, Br or I;
X=COOH, $SO_2OH$ or OPO(OH)$_2$,
n=0 or 1; and
m=0-10.

However, there may also be groups next to the end groups such as those containing
—CFH—,
—$(CH_2)_n$— with n=1 to 10,
—$(OCH_2)_n$— with n=1 to 10 or
—$(OCH_2CH_2)_n$— with n=1 to 10.

If the ionic fluoropolyether comprises non-ionic end-groups, typically these are groups such as, —$OCF_3$, —$OC_2F_5$, and —$OC_3F_7$.

However, the non-ionic end-groups may also be selected from the following:

—$(O)_n$—$(CR_1R_2)_m$—$CR_3R_4R_5$ wherein:
$R_1$=H, F, Cl, Br or I;
$R_2$=H, F, Cl, Br or I;
$R_3$=H, F, Cl, Br or I;
$R_4$=H, F, Cl, Br or I;
$R_5$=H, F, Cl, Br, I, alkyl or aryl;
n=0 or 1; and
m=0-10.

Furthermore, there may also be non-perfluorinated end groups such as those containing H, Cl, Br or I radicals.

Examples of non-perfluorinated end groups comprise structures such as:

—$CF_2R_6R_6$=H, Cl, Br, or I;

or

—$CFR_7$—$CF_3R_7$=H, Cl, Br or I.

The end-groups according to the formula of —$(O)_n$—$(CR_1R_2)_m$—$CR_3R_4R_5$ may also be selected from any combination of the following:
—$OCF_3$; —$OC_2F_5$; —$OC_3F_7$; —$OC_4F_9$; —$OC_5F_{11}$; —$OC_6F_{13}$; —$OC_7F_{15}$; —$OC_8F_{17}$; —$OC_9F_{19}$; —$OC_{10}F_{21}$;
—$OCF_2H$; —$OC_2F_4H$; —$OC_3F_6H$; —$OC_4F_8H$; —$OC_5F_{10}H$; —$OC_6F_{12}H$; —$OC_7F_{14}H$; —$OC_8F_{16}H$; —$OC_9F_{18}H$; —$OC_{10}F_{20}H$;
—$OCF_2Cl$; —$OC_2F_4Cl$; —$OC_3F_6Cl$; —$OC_4F_8Cl$; —$OC_5F_{10}Cl$; —$OC_6F_{12}Cl$; —$OC_7F_{14}Cl$; —$OC_8F_{16}Cl$; —$OC_9F_{18}Cl$; —$OC_{10}F_{20}Cl$;

—$OCF_2Br$; —$OC_2F_4Br$; —$OC_3F_6Br$; —$OC_4F_8Br$; —$OC_5F_{10}Br$; —$OC_6F_{12}Br$; $OC_7F_{14}Br$; —$OC_8F_{16}Br$; —$OC_9F_{18}Br$; —$OC_{10}F_{20}Br$;

—$OCF_2I$; —$OC_2F_4I$; —$OC_3F_6I$; —$OC_4F_8I$; —$OC_5F_{10}I$; —$OC_6F_{12}I$; —$OC_7F_{14}I$; —$OC_8F_{16}I$; —$OC_9F_{18}I$; —$OC_{10}F_{20}I$;

—$OCF_1H_2$; —$OC_2F_3H_2$; —$OC_3F_5H_2$; —$OC_4F_7H_2$; —$OC_5F_9H_2$; —$OC_6F_{11}H_2$; —$OC_7F_{13}H_2$; —$OC_8F_{15}H_2$; —$OC_9F_{17}H_2$; —$OC_{10}F_{19}H_2$;

—$OCFCl_2$; —$OC_2F_3Cl_2$; —$OC_3F_5Cl_2$; —$OC_4F_7Cl_2$; —$OC_5F_9Cl_2$; —$OC_6F_{11}Cl_2$; —$OC_7F_{13}Cl_2$; —$OC_8F_{15}Cl_2$; —$OC_9F_{17}Cl_2$; —$OC_{10}F_{19}Cl_2$;

—$OCF_1Br_2$; —$OC_2F_3Br_2$; —$OC_3F_5Br_2$; —$OC_4F_7Br_2$; —$OC_5F_9Br_2$; —$OC_6F_{11}Br_2$; —$OC_7F_{13}Br_2$; —$OC_8F_{15}Br_2$; —$OC_9F_{17}Br_2$; —$OC_{10}F_{19}Br_2$;

—$OCF_1I_2$; —$OC_2F_3I_2$; —$OC_3F_5I_2$; —$OC_4F_7I_2$; —$OC_5F_9I_2$; —$OC_6F_{11}I_2$; —$OC_7F_{13}I_2$; —$OC_8F_{15}I_2$; —$OC_9F_{17}I_2$; —$OC_{10}F_{19}I_2$;

—$CF_3$; —$C_2F_5$; —$C_3F_7$; —$C_4F_9$; —$C_5F_{11}$; —$C_6F_{13}$; —$C_7F_{15}$; —$C_8F_{17}$; —$C_9F_{19}$; —$C_{10}F_{21}$;

—$CF_2H$; —$C_2F_4H$; —$C_3F_6H$; —$C_4F_8H$; —$C_5F_{10}H$; —$C_6F_{12}H$; —$C_7F_{14}H$; —$C_5F_{16}H$; —$C_9F_{18}H$; —$C_{10}F_{20}H$;

—$CF_2Cl$; —$C_2F_4Cl$; —$C_3F_6Cl$; —$C_4F_8Cl$; —$C_5F_{10}Cl$; —$C_6F_{12}Cl$; —$C_7F_{14}Cl$; —$C_8F_{16}Cl$; —$C_9F_{18}Cl$; —$C_{10}F_{20}Cl$;

—$CF_2Br$; —$C_2F_4Br$; —$C_3F_6Br$; —$C_4F_8Br$; —$C_5F_{10}Br$; —$C_6F_{12}Br$; —$C_7F_{14}Br$; —$C_8F_{16}Br$; —$C_9F_{18}Br$; —$C_{10}F_{20}Br$;

—$CF_2I$; —$C_2F_4I$; —$C_3F_6I$; —$C_4F_8I$; —$C_5F_{10}I$; —$C_6F_{12}I$; —$C_7F_{14}I$; —$C_8F_{16}I$; —$C_9F_{18}I$; —$C_{10}F_{20}I$;

—$CF_1H_2$; —$C_2F_3H_2$; —$C_3F_5H_2$; —$C_4F_7H_2$; —$C_5F_9H_2$; —$C_6F_{11}H_2$; —$C_7F_{13}H_2$; —$C_8F_{15}H_2$; —$C_9F_{17}H_2$; —$C_{10}F_{19}H_2$;

—$CFCl_2$; —$C_2F_3Cl_2$; —$C_3F_5Cl_2$; —$C_4F_7Cl_2$; —$C_5F_9Cl_2$; —$C_6F_{11}Cl_2$; —$C_7F_{13}Cl_2$; —$C_8F_{15}Cl_2$; —$C_9F_{17}Cl_2$; —$C_{10}F_{19}Cl_2$;

—$CF_1Br_2$; —$C_2F_3Br_2$; —$C_3F_5Br_2$; —$C_4F_7Br_2$; —$C_5F_9Br_2$; —$C_6F_{11}Br_2$; —$C_7F_{13}Br_2$; —$C_8F_{15}Br_2$; —$C_9F_{17}Br_2$; —$C_{10}F_{19}Br_2$; and —$CF_1I_2$; —$C_2F_3I_2$; —$C_3F_5I_2$; —$C_4F_7I_2$; —$C_5F_9I_2$; —$C_6F_{11}I_2$; —$C_7F_{13}I_2$; —$C_8F_{15}I_2$; —$C_9F_{17}I_2$; —$C_{10}F_{19}I_2$.

Commercially available ionic fluoropolyethers suitable for the present invention are, for example, known also under the trade names Fomblin®, (Solvay Solexis), Fluorolink® (Solvay Solexis), Krytox® (DuPont) and Demnum® (Daikin Kogyo Co. Ltd.). These compounds are available in a substantially pure form, and are also sometimes supplied as a micro-emulsion in water, such as Fomblin® FE 20C or Fomblin® FE 20 EG.

Suitable ionic fluoropolyether structures which are commercially available are as follows:

Fluorolink® C and Fluorolink® C 10:
HOOC—$CF_2$—$(OCF_2CF_2)_n$—$(OCF_2)_m$—O—$CF_2$—COOH where m+n=8 to 45 and m/n=20 to 1 000

Fluorolink® F 10:
$PO(OH)_{3-y}(EtO)_x]_y$—$CH_2$—$CF_2$—$(OCF_2CF_2)_n$—$(OCF_2)_m$—O—$CF_2$—$CH_2(EtO)_x]_yPO(OH)_{3-y}$
where m+n=8 to 45 and m/n=20 to 1 000, Krytox® 157 FSL
F—$[CF(CF_3)CF_2O]_n$—$CF(CF_3)$—COOH where n~14 ($M_n$=2 500),
including Krytox® 157 FSM ($M_n$=3 500-4 000) and Krytox® 157 FSH ($M_n$=7 000-7 500), Demnum® SH
$CF_3$—$CF_2$—$CF_2O$—$(CF_2$—$CF_2CF_2O)_m$—$CF_2$—$CF_2COOH$ (molecular weight 3 500).

The component comprising an ionic fluoropolyether or a precursor thereof may be a viscous liquid at 60° C. with viscosities ranging from about 5 mPas to about 1 000 000 mPas, about 10 mPas to about 500 000 mPas or preferably about 30 mPas to about 50 000 mPas.

The ionic fluoropolymers may be insoluble in water.

The equivalent weight of an ionic fluoropolyether is defined to be the molecular weight of the ionic fluoropolyether divided by the number of ionic groups present in the fluoropolyether.

The equivalent weight of the ionic fluoropolyether in one embodiment ranges from 400 to 15000 g/mol, in a further embodiment ranges from 500 to 10000 g/mol, and in still a further embodiment ranges from 700 to 8000 g/mol.

If the equivalent weight is too low, the solubility in water will be too high. If the equivalent weight is too high the processing properties will be deteriorated.

The term "counter-ionic agent" is intended to denote any compound bearing an ionic charge opposite to the charge of the ionic groups of the fluoro polyether, except for $H^+$ and $Na^+$.

The counter-ionic agent and the ionic fluoropolyether upon their mixture form a complex in which the electronic charge present on the ionic groups of the fluoropolyether is at least in part balanced by the electronic charge present on the counter-ionic agent, as explained in detail below. Such complexes, i.e. ionic fluoropolyether charge balanced with the counter-ionic agent, will generally be in the form that a network of ionic fluoropolyether molecules and counter-ionic agent species is formed extending over the entire coating so that the coating can be regarded as "cross-linked".

However, with $H^+$ such a complex formation is not or not to a sufficient degree possible. It is well known that organic carboxylic acids primarily exist in the hydrogen bonded dimeric form. Similarily, with $Na^+$, the degree of complex formation is insufficient, leading to concerns about the stability and durability of the coating on polymer substrates.

With metal and metal oxides substrates $Na^+$ counterions result in highly hydrophobic surfaces where the perfluoropolyether moiety extends freely outward and the $Na^+$ end is evidently on the surface (U.S. Pat. No. 6,638,622). This behaviour is likely to be stable with metal or metal oxide surface to associate with the $Na^+$. But with polymeric substrates the $Na^+$ end is exposed and the limited complex formation does not work for this invention.

The counter-ionic agent may be a metal ion, such as a monovalent, bivalent, trivalent, tetravalent, polyvalent metal ion, or non-metal ion bearing one or more charges such as a charged organic species including ammonium ions, organic polycations and polymeric ions such as intrinsically conductive polymers, or may be a mixture of two or more of these ions. The counter ionic agent may also be a zwitterionic compound, i.e. a compound bearing both negative and positive charges.

The counter-ionic agent may be selected from the groups of organic ions or non-alkali metal ions.

In one embodiment, the counter-ionic agent includes a metal ion excluding $Na^+$ having a charge of +1, +2, +3 or +4, such as found in alkali metal cations, earth alkali metal cations, transition metal ions and lanthanoid metal cations.

In the embodiment where the counter-ionic agent comprises metal ions, these may be selected from earth alkali metal cations, $Al^{3+}$, transition metal ions and lanthanoid metal cations Examples of suitable metal ions include $Ag^+$, $Cu^+$, $Cu^{2+}$, $Ca^{2+}$, $Mg^{2+}$ $Al^{3+}$, $Zn^{2+}$, $Ce^{3+}$, $Ce^{4+}$, $Cr^{3+}$, $Ni^{2+}$ and $Co^{2+}$.

Where antimicrobial properties of the coated article are desired, the counter-ionic agent may include ions having antimicrobial activity.

In a further embodiment of the antimicrobial article, the counter-ionic agent may consist of ions having antimicrobial activity.

The term "antimicrobial activity" as used herein is intended to denote any activity in killing microorganisms such as bacteria, fungues, viruses etc.

For example, ions having antimicrobial activity comprise Ag, Au, Pt, Pd, Ir and Cu, Sn, Bi and Zn ions, and charged organic species, a zwitterionic compound or a polycation such as organic cationic species, like cationic polyelectrolytes, N-alkylated quaternary ammonium cations and derivatives, polymers from N-alkylated 4-vinyl pyridine, quaternized ethyleneimine, quaternized acrylic acid derivatives and their copolymers.

Suitable monomers for charged organic species, a zwitterionic compound or a polycation comprise cationic monomers like quaternary ammonium salts of substituted acrylamide, methayrylamide, acrylate, methacrylate, 2-vinyl pyridine, 4-vinyl pyridine, 2-vinyl piperidine, 4-vinyl piperidine, vinylamine, diallylamine.

Preferred polycations are poly(4-vinylpyridine) including alkylated poly(4-vinylpyridine), polyethyleneimine (PEI) and alkyl substituted PEI, poly(diallyldimethylammonium) (PDADMA), poly(allylamine hydrochloride), polyvinylamine and copolymers and mixtures thereof.

In another aspect, the polycations may comprise at least one quaternary amine ion.

Use of polycations as counter-ionic agents is suitable for enhancing the antimicrobial properties of the coating, particularly on membranes, paper and textiles and in the field of permeability adjustment as well as for surface modification to bind active species.

In one embodiment, the ions having antimicrobial activity comprise Ag, Au, Pt, Pd, Ir and Cu, Sn, Bi and/or Zn ions, in a further embodiment the ions having antimicrobial activity comprise Ag, Cu and/or Zn ions, and in still a further embodiment the ions having antimicrobial activity comprise Ag ions.

In the embodiment where the ions having antimicrobial activity comprise, or consist of, Ag ions ($Ag^+$), the coatings can be made by incorporation of silver acetate, silver carbonate, silver nitrate, silver lactate, silver citrate and oxides as well as mixtures and derivatives thereof, as precursors of $Ag^+$ in the mixture for preparing the coating.

It is also possible and may be advantageous for specific effectiveness to use combination of the above mentioned ions having antimicrobial activity, such as combinations of silver and copper, silver and zinc, silver and cationic polyelectrolytes.

In the embodiments where the ions having antimicrobial activity comprise Ag, Au, Pt, Pd, Ir and Cu, Sn, Bi and/or Zn ions, the ions having antimicrobial activity optionally may further comprise charged organic species, a zwitterionic compound or a polycation such as organic cationic species, like cationic polyelectrolytes, N-alkylated quaternary ammonium cations and derivatives, polymers from N-alkylated 4-vinyl pyridine, quaternized ethyleneimine, quaternized acrylic acid derivatives and their copolymers.

Where the functional coating must withstand harsh environments such as water or organic solvents, the counter-ionic agent may comprise multi-valent metal ions because they are known to form multidimensional ionic networks which can be expected to be particularly stable.

In another embodiment of the article of the invention, the counter-ionic agent includes, or consists of, surface charged nanoparticles.

In still another embodiment, the counter-ionic agent consists of surface charged nanoparticles.

The multiple charges present in the surface charged nanoparticles form a complex with multiple points of interactions with the ionic fluoropolymer, resulting in a stable coating.

Examples of such nanoparticles include nanoparticles of colloidal organic salts, organic colloidal polymers, polystyrenesulfonate, dyes and inks, and intrinsically conducting polymers, IPC.

Non-charged nanoparticles may be provided with surface charges by coating with polyelectrolytes such as cationic polyelectrolytes, for example polyethylenimine (PEI).

If nanoparticles contain surface functional groups, for example, by treating them with organic compounds like carboxylic acids, sulfates, phosphates, silanes, diols and polyols, a cationic polyelectrolyte can e.g. be used to bridge the nanoparticles with an anionically charged fluoropolymer.

The surface charged nanoparticles typically are non-water soluble organic molecules in form of single molecules, colloids, oligomers and/or polymers.

The size of these surface charged nanoparticles dispersed in a liquid in one embodiment is between 5 and 500 nm, in a further embodiment is between 10 and 200 nm, and in still a further embodiment is between 20 to 100 nm.

The particles size of surface charged nanoparticles dispersed in a liquid, such as water, may be measured by laser Doppler technique. For example, Ormecon™, a polyaniline dispersion, is available in form of 10 to 100 nm particles measured by laser Doppler technique.

The surface charged nanoparticles in one embodiment include an intrinsically conductive polymer.

The term "intrinsically conductive polymer" (ICP) is intended to denote organic polymers containing polyconjugated bond systems such as double and triple bonds and aromatic rings which have been doped with electron donor or electron acceptor dopants to form a charge transfer complex having an electrical conductivity of at least about $10^{-6}$ S/cm by the four-in-line probe method.

Dopants act as charge balancing counterions to the ICP, as well as keeping the ICP dispersed in water.

These dopants are mostly anionic water soluble materials like single ions, anionic surfactants, anionic polyelectrolytes including polyacrylic acid, polystyrene sulfonic acid and derivatives, or combination thereof.

Examples of ICPs are ICPs made from polymers like polyaniline and substituted polyanilines, polypyrrole and substituted polypyrroles, polyacetylene and substituted polyacetylenes, polythiophene and substituted polythiophenes, polyphenylene such as polyparaphenylene and substituted poly(para)phenylens, polyazine and substituted polyazines, poly-p-phenylene sulfide and substituted poly-p-phenylene sulfides, as well as mixtures and/or copolymers thereof.

Typical commercially available intrinsically conductive polymers are poly(3,4-ethylenedioxythiophene) PEDOT supplied by H. C. Starck, GmbH and called Clevios™ P or PH now (former Baytron®, Baytron®-P or -PH). Exemplarily there may also be mentioned substituted polythiophenes like polythienothiophene, polyaniline (Covion Organic Semiconductors GmbH—Frankfurt and Ormecon™—Ammersbek), polypyrrole (Sigma-Aldrich, St. Louis, Mo.), polyacetylenes, and combination thereof. Polyacetylene, poly(N-substituted pyrrole), poly(N-substituted aniline), poly(paraphenylene), poly(phenylenesulfide) including their doping systems also can be used as the intrinsically conductive polymer.

The use of intrinsically conductive polymers as the counter-ionic agent yields coatings with excellent breathability and is particularly advantageous for coating the outer and inner surface of pores and/or for ultra-thin coatings on substrates, especially fluoropolymer substrates.

The use of intrinsically conductive polymers as the counter-ionic agent, furthermore, allows the production of coatings having an excellent balance of antistatic properties, fire retardance and at the same time breathability.

Moreover, the use of intrinsically conductive polymers yields highly antistatic coatings having excellent adhesion properties. Additionally, intrinsically conductive polymers can be used for oleophobic coatings.

Intrinsically conductive polymers are available as small nanoparticles stabilized in water based dispersions or organic formulations.

In one embodiment, aqueous dispersions of [poly(3,4-ethylenedioxythiophene)poly(styrene sulphonate)] intrinsically conductive polymers in form of nanoparticles such as in Clevios™ P or PH (former Baytron® P or PH) are used.

The size of the dispersed nanoparticles, which are hence in a swollen state, in one embodiment is between 5 and 500 nm, in a further embodiment is between 10 and 200 nm, and in still a further embodiment is between 20 to 100 nm.

The particles size of dispersed nanoparticles of intrinsically conductive polymers may be measured by laser Doppler technique. For example, Ormecon™, a polyaniline dispersion, is available in form of 10 to 50 nm particles measured by laser Doppler technique.

Furthermore, the mean size of the dispersed nanoparticles in one embodiment is between 5 and 500 nm, in a further embodiment is between 10 and 200 nm, and in still a further embodiment is between 20 to 100 nm.

The mean swollen particle size of dispersed nanoparticles of intrinsically conductive polymers may be measured by ultracentrifugation. For example, Clevios™ P (former Baytron® P) grades have been measured by ultracentrifugation and the results are reported in S. Kirchmeyer, K. Reuter in J. Mater. Chem., 2005, 15, 2077-2088.

In the final coating, the ionic fluoropolyether and the counter-ionic agent will be present in the form of a complex.

In one embodiment, the amount of counter-ionic agent or its precursor is selected so that the amount of counter-ionic agent is from 0.05 to 1.0 charge equivalents, in a further embodiment is from 0.1 to 0.99 charge equivalents, in still a further embodiment is from 0.15 to 0.95 charge equivalents, in still a further embodiment is from 0.2 to 0.90, and in still a further embodiment is from more than 0.5 to 0.90 charge equivalents of the amount of ionic groups present in the ionic fluoropolyether in the final coating.

This means that in those embodiments 5 to 100%, 10 to 99%, 15 to 95%, 20 to 90% and more than 50 to 90%, respectively, of the ionic charges of the ionic fluoropolyether in the final coating are balanced by the ionic charges of the intrinsically conductive polymer, and hence in those embodiments 5 to 100%, 10 to 99%, 15 to 95%, 20 to 90%, and more than 50 to 90%, respectively, of the ionic fluoropolyether in the final coating are cross-linked by the intrinsically conductive polymer, and thus present in the form of a complex.

If the amount of counter-ionic agent is too low, the functionality, such as antimicrobial, hydrophilicity, electrical conductivity, or color, of the coating will be comparatively low. On the other hand, if the amount of counter-ionic agent is too high, the counter-ionic agent will be embedded by the polymer chains of the ionic fluoropolyether without contributing to complexing, leading e.g. to leachability of the coating.

The amount of intrinsically conductive polymer selected to provide a charge balance in the range of 5 to 100%, in the range of 10 to 99%, in the range of 15 to 95%, in the range of 20 to 90%, and in the range of from more than 50 to 90%, respectively, allows for the production of coatings having an unique balance of properties including antistatic, fire retardancy, breathability, chemical resistance and mechanical properties.

If more than 50% of the ionic charges of the ionic fluoropolyether in the final coating are balanced by the ionic charges of the counter-ionic agent and hence cross-linked, a drastic reduction of water uptake and hence swelling can be achieved.

For example, if more than 50% of the ionic charges of the ionic fluoropolyether in the final coating are balanced by the ionic charges of a bivalent metal counter-ionic agent and hence complexed, a drastic increase in water wettability and hence water flux can be achieved.

Due to the complex formation of the components, the ionic fluoropolymer and the surface charged nanoparticles, the coating has a comparatively high electrical conductivity but a comparatively low conductivity for protons.

The coating in the article of the present invention may be an "outer coating", i.e. a coating which is present as a substantially continuous layer ("monolithic coating"), or a discontinuous e.g. dot-like pattern on an outer surface of the substrate, and/or an "inner coating", i.e. a coating present on the inner and outer surface of the pores of a porous substrate, but not occluding them.

The coating may also completely fill the pores of the porous substrate, i.e. the coating may be fully imbibed in the substrate, thus occluding the pores.

An outer, e.g. monolithic, coating may be present on one side or on both sides of a substrate.

A monolithic coating may also form a) an intermediate layer between two substrates, e.g. two microporous membranes or one microporous membrane and one textile layer, or b) part of a multicoated layer on a substrate, e.g. one layer between two other coatings or the topcoating at the most outer surface.

FIG. 1a shows a schematic drawing of a monolithic coating 30 in the form of a layer on an outer surface a substrate 20.

As a monolithic coating is usually airtight, in case of a porous substrate, air flow through the coated article will be prevented by a monolithic coating. By "airtight layer" and by "prevention of airflow" is meant that no airflow is observed for at least two minutes as determined by the Gurley test described in the experimental part.

The thickness of the final coating for monolithic coatings in one embodiment is in the range of 0.05 to 25 micrometer. Within this range a skilled person will be able to find the most suitable thickness depending on the intended use.

For achieving an extraordinary balance of properties for the coated substrate, such as MVTR and antistatic properties, MVTR and oleophobicity, MVTR and flame retardency, the thickness of the coating for monolithic coatings may be in the range of 0.075 to 25 micrometer.

If the layer is thinner than 0.05 micrometer the durability of the coating will be low.

In one embodiment, the laydown of the final coating on the substrate is from 0.1 to 10 g/m$^2$ based on the outer surface of the substrate.

For example, the lowest laydown for a monolithic coating on ePTFE starts usually at 0.3 g/m$^2$ on a membrane.

Laydown and coating thickness will effect durability and breathability (MVTR) and should be adjusted depending on the intended use.

Breathability or moisture vapour transport rate of monolithic coated porous substrates, such as ePTFE films, is characterized by the MVTR value. Typically, the MVTR of a substrate, in particular an ePTFE substrate, with a monolithic coating on the porous membrane will be above 25 000 g/m$^2$ 24 h. In one embodiment, the MVTR is adjusted to be above 40 000 g/m$^2$ 24 h, and in a further embodiment, the MVTR is above 60 000 g/m$^2$ 24 h.

The MVTR of the coated article of the invention remains high at low relative humidity.

Figure 1B:
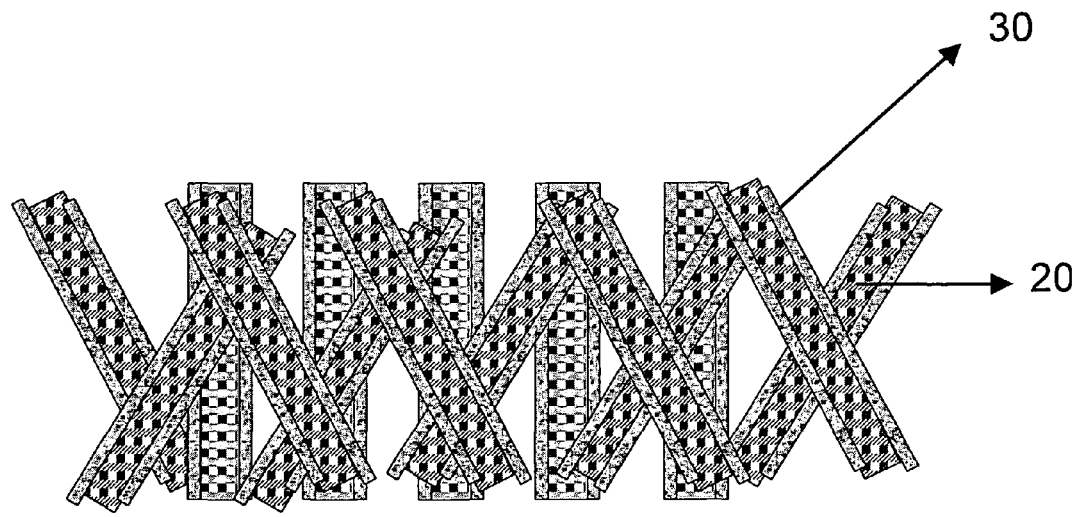

A schematic drawing of an inner coating present on the inner and outer surface of the pores 20 on a porous substrate 30 is shown in FIG. 1*b*.

Such an inner coating is in the form of an air permeable coating, i.e. the coating is present on the inner and outer surface of the pores of the substrate without, however, occluding the pores.

The inner coating results in an air permeable porous substrate after coating, provided, of course, that no additional monolithic coating is applied to the substrate which prevents air flow. By air permeability is meant the observation of a certain volume of air through a defined area of material as determined by the Gurley test described below. Inner coatings allow the construction of air permeable scaffolds with functionalized surfaces, particularly on microporous substrates such as thin membranes, for example.

The thickness of an inner coating in one embodiment is above 0.05 micrometer.

Inner coatings may be applied to ultra thin substrates below a thickness of 500 nanometer and may also be applied to ultra thin substrates below a thickness of 250 nanometer.

Inner coatings may furthermore be applied for the coating of microporous membranes, such as ePTFE. For an inner coating, the mean flow pore size of ePTFE may be between 0.05 micrometer and 15 micrometer, in a further embodiment may be between 0.1 micrometer and 10 micrometer.

In another embodiment, the coating is formed on a porous substrate such that all pores are completely filled, i.e. fully imbibed, with the coating material, and hence the pores are occluded.

Fully imbibed coatings are mainly applied in ultra thin substrates. Thus, a fully imbibed coating may be applied to a substrate with a thickness of 25 micrometer or below, or may be applied to a substrate with a thickness of 15 micrometer or below. Thicker constructions can be made by layering these fully imbibed articles.

Of course, one or more outer coatings, on the one hand, and inner coatings or fully imbibed coatings, on the other hand, may be applied a) simultaneously and/or b) step by step to a substrate. For example, a porous substrate may have a monolithic coating on at least one outer surfaces and an inner coating within the pores.

The hydrophilicity and the hydrophobicity properties of a coated polymeric substrate can easily be set by selection of the counter-ionic agent and by selection of the ionic fluoropolyether. For example in the prior art using intrinsically conductive polymers coated at surfaces creates hydrophilic surfaces wetted easily by water. But according to the invention for example using intrinsically conductive polymers as the counter ionic agent enhances hydrophobicity of the surface.

The present invention allows the production of oleophobic articles having an improved oil rating. The oil rating (AATCC test method 118-2000) describes how strongly a porous surface repels oils. A high oil rating is strongly repellent to oils. Oleophobic articles are usually characterized by oil ratings greater than or equal to 2, or even higher than 4, i.e. the coatings at the surface of the article preferably repel any liquid with a surface tension higher than 30 mN/m (oil rating 2) or even higher than 25 mN/m (oil rating 4).

The invention allows the production of coatings which in one embodiment yield a surface resistance of below $10^{11}$ Ohm/square, in a further embodiment yield a surface resistance of below $10^9$ Ohm/square, and in still a further embodiment yield a surface resistance of below $10^8$ Ohm/square, e.g. between $10^4$ to $10^8$ Ohm/square.

It is furthermore possible to provide an antistatic article according to the invention, whereby the surface of the coated article has a charge decay time at 20 percent relative humidity of less than 5 seconds as measured according to DIN EN 1149-3. Such low charge decay times can be accomplished by the use of intrinsically conductive polymers as the counter ionic agent. Particularly low charge decay times are obtained with polythiophens.

It is possible to produce the article according to the invention having a coating comprising a complex of an ionic fluoropolyether and a counter-ionic agent by coating a precursor of the ionic fluoropolyether on the substrate in a first step. In a second step an ion exchange reaction may be effected after coating.

However, in one embodiment a process for the production of a coating on a substrate is used comprising the steps of a) preparing a mixture of an ionic fluoropolyether or a precursor thereof and a counter-ionic agent or a precursor thereof; and b) applying the mixture prepared in step a) onto a substrate.

In this process, in a first step (step a)) a mixture of an ionic fluoropolyether or a precursor thereof and a counter-ionic agent or a precursor thereof in any of the embodiments described above is made. Mixing of the components is carried out until the mixture is homogeneous, i.e. all components are evenly distributed therein.

The reaction sequence of producing the mixture of the components in a first step and applying the mixture onto the substrate only in a second, subsequent step allows for a thorough mixing of the components and hence to an entirely homogeneous and even distribution of the two components in the mixture and, consequently, also in the final coating. This, in turn, is important in order to obtain the desired properties. Furthermore, by the pre-mixing step it is ensured that the coating has a good durability on the substrate and none of the components, in particular the counter-ionic agent, is easily leached out by contact with water.

The mixture in step a) may be in liquid form. This can either be so because the mixture of the components is liquid as such, or because one or all of the components have been dissolved, emulsified or dispersed in a solvent.

The mixture of the components as liquid in one embodiment has a viscosity greater than 50 mPas, in a further embodiment has a viscosity greater than 60 mPas, and in still a further embodiment has a viscosity greater than 70 mPas at 25° C.

The coating mixture comprising the ionic fluoropolyether and the counter ionic agent may have a surface tension lower than about 35 mN/m, or may have a surface tension lower than 30 mN/m, or may even may have a surface tension lower than 20 mN/m.

Typically, the two component complex may have a surface tension lower than about 30 mN/m.

Such low surface tensions of the ionic fluoropolyether and counter ionic agent formulations are helpful for coating polymeric substrates, particularly fluoropolymers such as PTFE, which have very low surface energies. For most applications, no coating additives are required.

The ionic fluoropolyether or its precursor may be present in the mixture in a concentration of from more than 80% by weight, or more than 90% by weight, or even more than 95% by weight if the second component, the counter-ionic agent, are small ions up to an atomic mass of 50.

The ionic fluoropolyether or its precursor may be present in the mixture in a concentration of from more than 70% by weight, or more than 80% by weight, or even more than 85% by weight if the second component, the counter-ionic agent, are ions up to an atomic mass of 150.

The ionic fluoropolyether or its precursor may be present in the mixture in a concentration of from more than 40% by weight, or more than 50% by weight, or even more than 55% by weight if the second component, the counter-ionic agent, are ionic species up to a molecular weight of 800 g/mol.

Furthermore, the counter-ionic agent or its precursor may be present in the mixture in a concentration of from 2.5 to 4.5% by weight if the second component, the counter-ionic agent, are small ions up to an atomic mass of 50.

Still further, the counter-ionic agent or its precursor may be present in the mixture in a concentration of from 8.0 to 14% by weight if the second component, the counter-ionic agent, are ions up to an atomic mass of 150.

Finally, the counter-ionic agent or its precursor may be present in the mixture in a concentration of from 25 to 45% by weight if the second component, the counter-ionic agent, are ionic species up to a molecular weight of 800 g/mol.

As mentioned, precursors of the ionic fluoropolyether and counter-ionic agents are such compounds which can be transferred into ionic fluoropolyether and counter-ionic agents, respectively, by simple chemical reactions.

Usually, in step a) of the process, a mixture of precursors of the ionic fluoropolyether and/or counter-ionic agent will be prepared. This mixture may then be subjected to conditions under which a reaction of the precursor(s) to the final ionic fluoropolyether and the counter-ionic agent takes place before the application of the mixture onto the substrate.

The mixture may thus contain the ionic fluoropolyether and the counter-ionic agent and not only their precursors before coating the substrate in step b).

For example, a mixture can be prepared with one component being a precursor of a fluoro polyether having —COO⁻ groups. In this precursor, these groups bear H atoms which are covalently bonded to the —COO⁻ group so that this group is not in the form of bearing an electric charge. As the second component, a precursor of the counter ionic agent $Mg^{2+}$ may be used which might be magnesium acetate. Both components can be mixed in liquid form together at ambient temperature, but the precursors will not react under those condition.

In this example, the mixture may be heated to a temperature where a reaction between the precursors takes place so that acetic acid evaporates from the mixture and the fluoropolyether complex having —COO⁻ groups and $Mg^{2+}$ ions is formed.

However, the mixture of the precursor(s) of the ionic fluoropolyether and/or the counter-ionic agent may also be applied to the substrate. For obtaining the final complex, the coated substrate must be subjected to conditions under which a reaction of the precursor(s) to the ionic fluoropolyether complex with a counter-ionic agent takes place.

When the ionic fluoropolyether and the counter-ionic agent are mixed, either upon their formation from the precursor(s) or when they are mixed as such, a complex of the ionic fluoropolyether and the counter-ionic agent is formed in which the ionic charges of the fluoropolyether are at least in part balanced by the ionic charges of the counter-ionic agent. It is believed that this leads to a rearrangement of the fluoropolyether molecules, or at least their ionic groups, and the counter-ionic agent species in the mixture. This rearrangement can form a network throughout the coating and hence a type of "cross-linking" of the ionic fluoropolyether with the counter-ionic agent species within the mixture.

This complex formation causes e.g. an increase in viscosity of the liquid mixture where the ionic fluoropolyether and the counter-ionic agent as such are mixed before the mixture is applied to the substrate.

In the final coating, in any case the ionic fluoropolyether and the counter-ionic agent will be present in the form of said complex.

Typically, the mixture containing the complex of the ionic fluoropolyether and the counter-ionic agent present on the substrate will be heated or dried, especially if the applied mixture comprising the complex of the ionic fluoropolyether and the counter-ionic agent still comprises a solvent. This drying step can be effected by known techniques in the art, such as reduction of pressure, heating and combinations thereof.

The coating after step b) may be heated to a temperature of 100 to 200° C., in a further embodiment may be heated to 150 to 190° C., and in still a further embodiment may be heated to 160 to 180° C.

If the temperature is too low, the production time will be unacceptably long. If the temperature is too high, a polymer degradation might occur and a non-uniform coating might be obtained.

Furthermore, in one embodiment the external pressure is the normal air-pressure.

In the following, specific embodiments of the article of the invention are described. These embodiments are also part of the invention. If not mentioned otherwise, the above-described embodiments of the mixture, its components, and the coating apply also in these specific article embodiments.

In a first embodiment, an article comprising a highly water stable antimicrobial coating is obtained.

In this embodiment, the coating comprises a complex of an ionic fluoropolyether and a counter-ionic agent which comprises ions having antimicrobial activity.

The term "antimicrobial activity" as used herein is intended to denote any activity in killing microorganisms such as bacteria, fungues, viruses etc.

For example, ions having antimicrobial activity comprise Ag, Au, Pt, Pd, Ir and Cu, Sn, Bi and Zn ions, and charged organic species, a zwitterionic compound or a polycation such as organic cationic species, like cationic polyelectrolytes, N-alkylated quaternary ammonium cations and derivatives, polymers from N-alkylated 4-vinyl pyridine, quaternized ethyleneimine, quaternized acrylic acid derivatives and their copolymers.

The use of such coatings provides antimicrobial properties in combination with increased oleophobicity. These coatings furthermore may prevent biofilm buildup and/or allow the combat of biofilms. Biofilms are complex aggregations of microorganism marked by the excretion of a protective and adhesive matrix.

These embodiments are particularly attractive in the case of inner coatings as the outer and the inner side of the article is protected from bacteria and/or biofilm. Thus, other properties, such as breathability and air permeability are upheld over a long time.

Suitable monomers for charged organic species, a zwitterionic compound or a polycation comprise cationic monomers like quaternary ammonium salts of substituted acrylamide, methacrylamide, acrylate, methacrylate, 2-vinyl pyridine, 4-vinyl pyridine, 2-vinyl piperidine, 4-vinyl piperidine, vinylamine, diallylamine.

Embodiments of polycations are poly(4-vinylpyridine) including alkylated poly(4-vinylpyridine), polyethyleneimine (PEI) and alkyl substituted PEI, poly(diallyldimethylammonium) (PDADMA), poly(allylamine hydrochloride), polyvinylamine and copolymers and mixtures thereof.

In another aspect, the polycations may comprise at least one quaternary amine ion.

Use of polycations as counter-ionic agents is suitable for enhancing the antimicrobial properties of the coating, particularly on membranes, paper and textiles and in the field of permeability adjustment as well as for surface modification to bind active species.

In one embodiment, the ions having antimicrobial activity comprise Ag, Au, Pt, Pd, Ir and Cu, Sn, Bi and/or Zn ions, in a further embodiment the ions having antimicrobial activity comprise Ag, Cu and/or Zn ions, and in still a further embodiment the ions having antimicrobial activity comprise Ag ions.

In the embodiment where the ions having antimicrobial activity comprise Ag ions ($Ag^+$), the coatings can be made by incorporation of silver acetate, silver carbonate, silver nitrate, silver lactate, silver citrate and oxides as well as mixtures and derivatives thereof, as precursors of $Ag^+$ in the mixture for preparing the coating.

It is also possible and may be advantageous for specific effectiveness to use combination of the above mentioned ions having antimicrobial activity, such as combinations of silver and copper, silver and zinc, silver and cationic polyelectrolytes.

In the embodiments where the ions having antimicrobial activity comprise Ag, Au, Pt, Pd, Ir and Cu, Sn, Bi and/or Zn ions, the ions having antimicrobial activity optionally may further comprise charged organic species, a zwitterionic compound or a polycation such as organic cationic species, like cationic polyelectrolytes, N-alkylated quaternary ammonium cations and derivatives, polymers from N-alkylated 4-vinyl pyridine, quaternized ethyleneimine, quaternized acrylic acid derivatives and their copolymers.

The coating can be used in articles useful in consumer healthcare, such as sterile packaging, clothing and footwear, personal hygiene products, medical devices like catheters, implants, tubes, wound closures including suture garn, dressings, air filters, water and liquid filters, etc.

In this embodiment, the invention allows the production of coated articles passing the "Zone of Inhibition" test for 24 h, or even for 48 h or more.

Depending on the coating form, monolithic and/or inner coating, the air flow properties also may easily be adjusted. In the case of inner coatings, it is particularly advantageous that the formation of biofilms is inhibited on the surface and within the pores.

The articles of this embodiment are further illustrated in Examples 1 to 7.

In a second embodiment of the article of the invention, a static protective article, in particular an article comprising a static protective fabric, is obtained. Static protective articles, such as garments or filters, are used to minimize sparks from static electricity.

In this embodiment, the coating comprises an ionic fluoropolyether and a counter-ionic agent which comprises surface charged nanoparticles.

In one embodiment, the surface charged nanoparticles are an intrinsically conductive polymer (ICP).

It is particularly advantageous in this embodiment that the ionic groups of the ionic fluoropolyether act as a non-volatile, non-leaching solvent and as stable dopant for the ICP. Without the dopant, the ICP would lose conductivity over time.

These coatings show extraordinary adhesion towards the substrate.

For example, an aqueous dispersion of [poly(3,4-ethylenedioxythiophene)poly(styrene sulfonate)] as ICP such as in Clevios® P or PH (former Baytron® P or PH) may be used.

The article of this embodiment is illustrated in Example 17.

In a third embodiment, an article comprising an oleophobic coating is obtained. In this embodiment, the coating comprises a complex of an ionic fluoropolyether and a counter-ionic agent which comprises an ion selected from monovalent (not $Na^+$) or bivalent/polyvalent counter-ionic agents or any combinations thereof.

The third embodiment allows the provision of a coating having an unique balance of extremely high adhesion of the coating to the substrate and high oleophobicity.

The repellency for liquids of the coated side of a substrate in the third embodiment when being coated in monolithic form is greater than or equal to liquids with a surface tension of 29.6 mN/m, or greater than or equal to liquids with a surface tension of 26.4 mN/m. This effect presumably is provided by the complex of the counter ionic agent and ionic fluoropolyether.

The oil rating of a porous substrate when the coating is present on the inner surface of the pores in the third embodiment is higher than or equal to than 1, or even higher than or equal to 2.

The articles of this embodiment are further illustrated in Examples 8 to 15.

In a fourth embodiment, an article showing a fast wettability with water is provided. In this embodiment, the coating comprises an ionic fluoropolyether and a counter-ionic agent which comprises an ion selected from $Me^+$ (not $Na^+$), $Me^{2+}$, $Me^{3+}$ or any combination thereof.

In this embodiment, the counter-ionic agent may comprise an ion selected from $Me^{2+}$.

The fast wetting coating may be applied on a porous substrate such as ePTFE.

In one embodiment, the fast wetting coating is applied as an inner coating.

The selection of those metal ions as counter-ionic agents provides a coating having excellent adhesion on the substrate as well as stability.

In a fifth embodiment, an article having a coating providing a color is obtained.

In this embodiment the ionic fluoropolyether may contain at least one carboxylic group and the counter-ionic agent may comprise a cationic dye, such as an acetate.

The present invention also relates to the use of an article in any of the above described embodiments for the manufacture of a garment or a filter element, and to the use of a complex composition comprising an ionic fluoropolyether and a counter-ionic agent for coating of a polymeric substrate.

The present invention will be further illustrated through the examples described below, and by reference to the following figures:

FIG. 1a: Schematic sectional view of an article (10) having a polymer porous substrate (20) and a monolithic coating (30) thereon.

FIG. 1b: Schematic sectional view of an article (10) having a polymer porous substrate (20) and a coating (30) thereon, which is present on the inner and outer surface of the pores ("inner coating").

Figure 2:
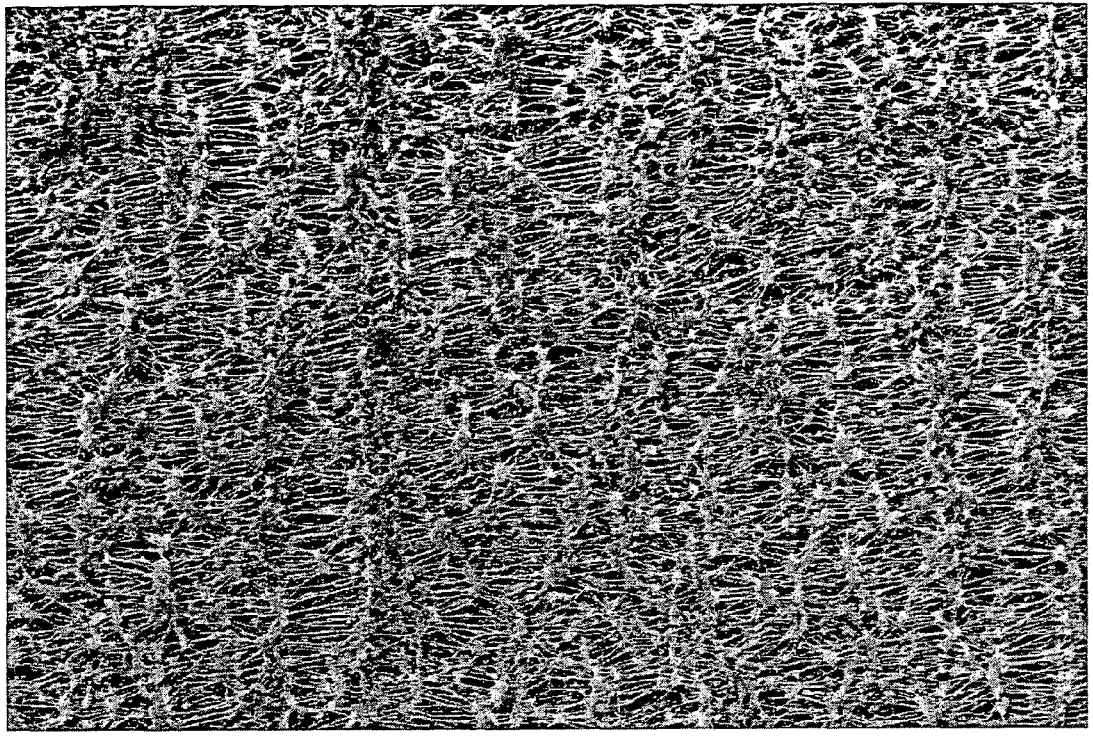

FIG. 2: SEM picture of the ePTFE membrane of Example 1 before coating (magnification 3500).

Figure 3:
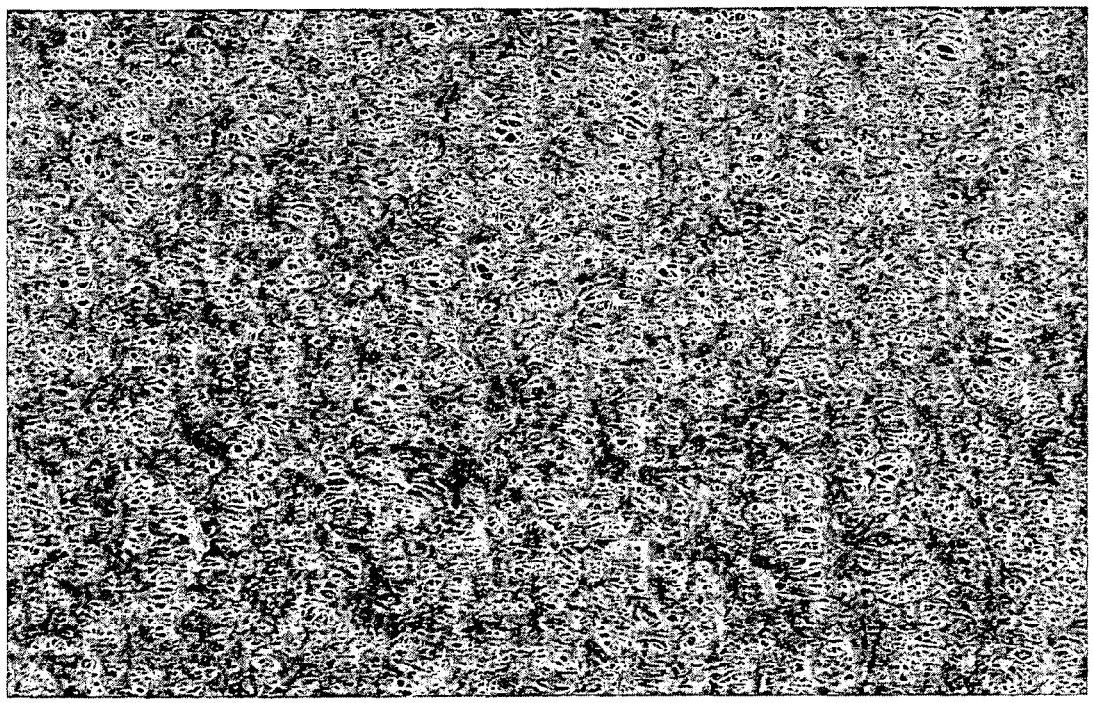

FIG. 3: SEM picture of the coated ePTFE membrane of Example 1 (magnification 3500).

Figure 4:
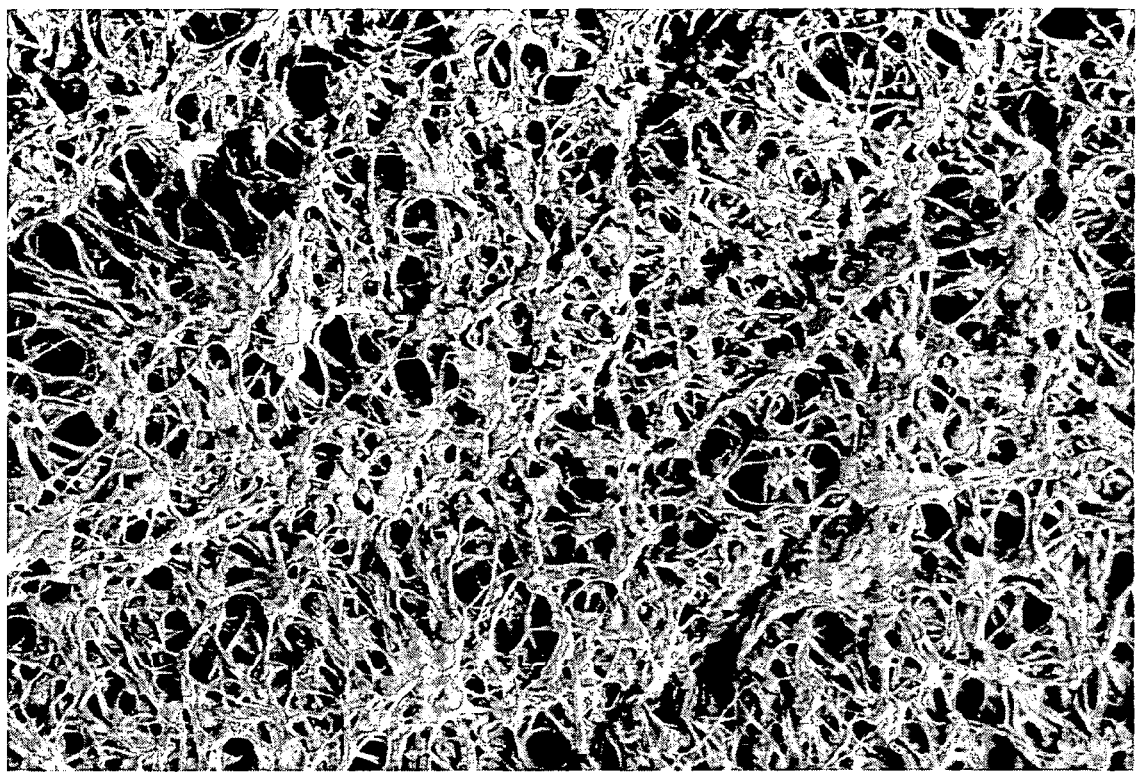

FIG. 4: SEM picture of the ePTFE coated membrane of Example 1 after exposure to *Pseudomonas Aeruginosa* for 24 h (magnification 5000).

Figure 5:
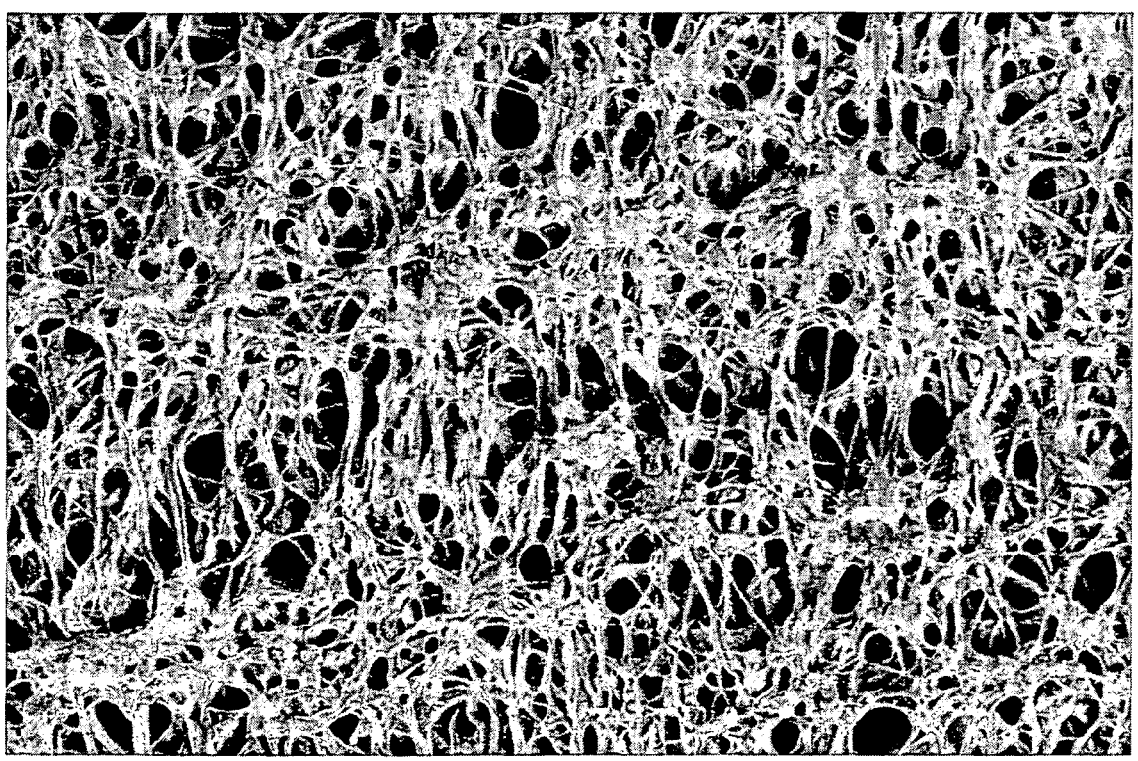

FIG. 5: SEM picture of the coated ePTFE membrane of Example 1 after exposure to *Staphylococcus Aureus* for 24 h (magnification 5000).

METHODS AND EXAMPLES a) Oil Repellency

Oil repellency was tested according to the AATCC test method 118-2000. The rating scale is 0-8, with "0" indicating the poorest degree of repellency. The lowest number that does not wet the substrate is the reported oil rating. High numbers indicate an excellent resistance to wetting oils.

0 is Nujol™, mineral oil (wets)
1 is Nujol™, mineral oil (31.2 mN/m) (repels)
2 is 65/35 Nujol/n-hexadecane (by volume, 29.6 mN/m)
3 is n-hexadecane (27.3 mN/m)
4 is n-tetradecane (26.4 mN/m)
5 is n-dodecane (24.7 mN/m)
6 is n-decane (23.5 mN/m)
7 is n-octane (21.4 mN/m)
8 is n-heptane (19.8 mN/m)

b) MVTR

Test of Water Vapor Permeability of Membrane and Laminate according to Hohenstein Standard Test Specification BPI 1.4.

Potassium acetate pulp is prepared by stirring potassium acetate at a ratio of 1 000 g potassium acetate to 300 g into distilled water and leaving to settle for at least 4 hours. 70 g±0.1 g of potassium acetate pulp is filled into a beaker. The beaker is covered with an ePTFE membrane and sealed.

A sample of 10×10 cm from the membrane/laminate to be tested is placed between beaker and a water bath at 23° C.±0.2° C. covered with an ePTFE membrane.

Each beaker's weight is recorded before (G1) and after (G2) the test.

Testing time for ePTFE: 5 minutes
Monolithic coated ePTFE: 10 minutes
Textile laminate: 15 minutes
Calculation of MVTR
for ePTFE: MVTR=((G2−G1)×433960)/5
for monolithic coated ePTFE: MVTR=((G2−G1)×433960)/10
for laminate: MVTR=((G2−G1)×433960)/15 c) Gurley Numbers

Gurley numbers [s] were determined using a Gurley Densometer according ASTM D 726-58.

The results are reported in terms of Gurley Number which is the time in seconds for 100 cubic centimeters of air to pass through 6.54 $cm^2$ of a test sample at a pressure drop of 1.215 $kN/m^2$ of water.

d) Frazier Numbers

Frazier numbers [cfm] were determined using an Air Permeability Tester III FX 3300 (TEXTEST AG) according ASTM D 737.

e) Mean Flow Pore Size [MFP, μm]

MFP was measured using a PMI (Porous Materials Inc.) Capillary Flow Porometer CFP 1500 AEXLS. The membrane was completely wetted with Silwick (surface tension 20 mN/m). The fully wetted sample is placed in the sample chamber. The chamber is sealed, and gas is allowed to flow into the chamber behind the sample to a value of pressure sufficient to overcome the capillary action of the fluid in the pore of the largest diameter. This is the Bubble Point Pressure. The pressure is further increased in small increments, resulting in flow that is measured until the pores are empty of fluid. The applied pressure range was between 0 and 8.5 bar. Beside mean flow pore diameter, the largest and smallest detected pore diameter were detected.

f) Charge Decay Time (CDT)

Charge decay time (CDT) was measured according DIN EN 1149-3.

g) Surface Resistivity

Surface resistivity was measured according ASTM D 257 between two parallel electrodes with a square configuration.

h) Antibacterial Properties

The bacteria used in this study were obtained from the American Type Culture Collection (Rockville, Md.). The materials were tested against *Staphylococcus aureus* ATCC #25923 and *Pseudomonas aeruginosa* ATCC #27853. The organisms tested were cultured on blood agar media for 24 hours at 34-37° C. The cultures were observed for colony morphology and purity by Gram Stain.

Material Preparation: Samples were cut on a clean bench into approximately 2.5-cm discs, and then were tested for the presence or absence of antimicrobial activity using the Zone of Inhibition Bioassay.

Zone of Inhibition Method:

The bacterial cultures were grown up on Trypticase Soy blood agar and aseptically suspended into Mueller-Hinton broth. Cultures were standardized to a Mc Farland's 0.5 barium chloride standard as described in a standard method for disc diffusion sensitivity testing P: SC: 318. The standardized cultures were streaked onto Mueller-Hinton agar plates to form a uniform lawn of bacteria. The test material samples were placed aseptically with the desired test surface side down in contact with the agar (see material key for surface tested). The plates were incubated at 34-37° C. for 24 hours. Plates were then observed for the presence or absence of a clear zone of inhibition surrounding the sample, or no visible growth under or on the test material. Zones were measured in millimeters and results recorded. If the zone is more than 25 mm the sample is considered to pass the test.

i) Biological Activity Tests

The tests are designed to determine the biological reactivity of mammalian cell cultures following contact with the elastomeric, plastics or other polymeric materials or extracts prepared from the materials. All tests use L929 mammalian (mouse) fibroplast cells. The AOL test (agarose overlay) and the MEM test (minimum essential medium) use a sheet of mammalian cells that is one cell thick (a monolayer) to determine whether a material is toxic or not. The MEM test is an extraction in which a specific amount of test material is extracted in a mostly saline liquid for 24 hours at 37° C. After this time the liquid/extract is placed on the cells for three days. After three days a red dye is put on the cells to determine the amounts of living and dead cells; the living cells take up the dye and turn red and the dead cells don't. The Agarose Overlay test uses the same type of cells and monolayer, except for this test a layer of agar is poured on top of the cell layer and the agar is allowed to solidify. A piece of test material (about 1 $cm^2$) is placed on the agar and any toxins in the material will diffuse through the agar layer and kill the cells. After one day the red dye is put on the agar and will dye the living cells red. The grading scale for the MEM test is 0 and 1 is nontoxic and 2, 3, and 4 are toxic. The grading scale for the AO test is 0, 1, and 2 are nontoxic and 3 and 4 are toxic. For both grading scales 0 is no toxic reaction and 4 is most toxic. The MEM test is considered to be more sensitive than the AO test.

j) Four-in-Line Probe Method

For determining the conductivity of the intrinsically conductive polymers the four in-line probe method described in "Laboratory Notes on Electrical Galvanometric Measurements" by H. H. Wieder, Elsevier Scientific Publishing Co. New York, N.Y. (1979) has been applied.

k) Thickness

The thickness of substrate films was measured using a Heidenhain thickness tester.

The thickness of coatings was calculated using the specific surface area of ePTFE as determined by BET, the laydown, and the density of the coating.

For example, the BET surface area of an ePTFE is 10 m$^2$/g. Fluorolink® C10 (Solvay Solexis) has a density of 1.8 g/m$^2$. Thus, a laydown of 1.8 g/m$^2$ Fluorolink® C10 on a flat surface would give a coating with a thickness of 1 micrometer. Assuming that the complete pore surface, i.e. the surface of all inner and outer pores, of said ePTFE is covered with the coating, a laydown of 1.8 g/m$^2$ Fluorolink® C10 will form a coating thickness of 100 nm divided by the weight of the porous ePTFE membrane. Similarity, a laydown of 3.6 g/m$^2$ Fluorolink® C10 will form a coating thickness of 200 nm divided by the weight of the porous ePTFE membrane.

l) Suter Test

The Suter test was carried out according AATCC Test 127-1989, the membrane sample being fixed even in a holder. The membrane should resist an applied water pressure of 0.2 bar for 2 min.

m) Microscopy

SEM pictures were made on LEO 1450 VP, samples were sputtered with gold.

n) EDX Test

EDX Analysis stands for Energy Dispersive X-ray analysis. The EDAX® unit (Ametek) worked as an integrated feature of the SEM. At 10 kV this technique was used for identifying the elemental composition of the specimen.

During EDX Analysis, the specimen is bombarded with an electron beam inside the scanning electron microscope. Thus, by measuring the amounts of energy present in the X-rays being released by a specimen during electron beam bombardment, the identity of the atom from which the X-ray was emitted can be established.

o) Water Wettability Test

A drop of water was placed at the substrate surface. Time for complete wicking in was recorded in seconds. Complete wetting for ePTFE can be seen by membrane clarification due to the pores filling with water.

p) KOH Membrane Resistance and Wettability

Membrane resistance was measured according ASTM D7148-07 standard test method for determining the ionic resistivity (ER) of alkaline battery separator using a carbon electrode in an electrolyte bath measuring system.

Separator ER and the separator's interaction with the electrolyte, that is resistance to wetting or flow, will contribute to the internal resistance of the battery and this can potentially limit the electrical output of a battery. The ER determination is a tool for battery manufacturers to use in design, material selection, and performance specifications.

The change in the bath electrical resistance imparted by a separator is affected by the porosity, thickness, and tortuousity of the pore structure of the separator, the wettability of the separator to the electrolyte, and the temperature and concentration of the electrolyte.

Incomplete wetting or saturation of the pore structure limits the lowest ER value obtainable from a separator structure.

Separators are pretreated to assure that the specimen being tested has been adequately wetted out. A separator that is not fully wetted out (saturated) will give a higher ER. Electrolyte was 5 n KOH.

In addition, the time in s was measured that a droplet of 5 n KOH needs to wick into ePTFE and clarifies the membrane.

q) Water Contact Angle

A sessile drop (4 µl) of bidistilled water was placed on the substrate at 25° C. The contact angle was measured using a DSA 10 unit (Krüss) after 5 and 30 seconds.

r) Viscosity

The viscosity of the reference liquids is determined by a Haake rheometer, model RheoStress 1. A plate/cone arrangement (cone designation C35/2Ti) was used for all the measurements. All given viscosity data refer to a temperature of 25° C. or 60° C. and a shear rate of 50 sec.$^{-1}$.

s) Surface Tension

Surface tension was measured with the processor tensiometer K 12 from KRÜSS-GmbH Hamburg using Wilhelmy's plate method. A plate of exactly known geometry was brought in contact with the liquid. The force with which the liquid moves along the wetting line on the plate was measured. This force is directly proportional to surface tension of the liquid.

EXAMPLES

Example 1

1.0 g silver acetate (98% pure, Merck) was added to 99.0 g Fluorolink® C (Solvay Solexis) and heated up to 90° C. under stirring until the silver acetate was reacted completely and no acetic acid was formed anymore. Proton exchange by silver ions was 6%. The viscosity was 124 mPas at 25° C.

An ePTFE membrane (mean flow pore size 0.178 µm, Gurley 12 s, thickness 34 µm, area weight 20.6 g/m$^2$) was solvent free coated with this mixture. The laydown of Fluorolink® C—Ag was 4.0 g/m$^2$ after heat homogenization at 130° C.

The coated membrane looks slightly yellow and has a mean flow pore size of 0.164 µm. The SEM picture of the coated membrane shown in FIG. 3 indicate a uniform coating layer at the surface of the inner and outer pores. Results see Table 1.

Comparative Example 1

The same ePTFE membrane as used in Example 1 (mean flow pore size 0.178 µm, Gurley 12 s, thickness 34 µm, area weight 20.6 g/m$^2$) was used in Comparative Example 1.

Example 2

10.0 g silver acetate (98% pure, Merck) was added to 90.0 g Fluorolink® C (Solvay Solexis) and heated up to 90° C. under stirring until the silver acetate was reacted completely and no acetic acid was formed anymore. Proton exchange by silver ions was 67%, the viscosity was 3 015 mPas at 25° C.

This example was performed to show that also higher degrees of ion exchange can be obtained easily.

Example 3

3.0 g pulverized silver acetate (98% pure, Merck) was added to 297.0 g Fluorolink® C (Solvay Solexis) and heated up to 90 to 95° C. under stirring until the silver acetate was reacted completely and no acetic acid was formed anymore. Proton exchange by silver ions was 6%.

Two different membranes were coated with this complex.

In Example 3a an ePTFE membrane with a water sessile drop contact angle of 138° (mean flow pore size 0.180 μm, Gurley 20 s, thickness 16 μm and area weight 19.3 g/m$^2$) was solvent free coated with this mixture by transfer roll technique. The rolls were heated up to 60° C.

The lay down of Fluorolink® C—Ag complex on the ePTFE was 3.0±0.5 g/m$^2$ after heat homogenization at 120° C. The coated membrane looks slightly yellow, the measured Ag concentration at the surface is 0.7% by weight. SEM pictures indicate a uniform coating layer at the surface of the inner and outer pores. The contact angle was 139° against water. Results for Example 3a see Table 1.

In Example 3b an ePTFE membrane (mean flow pore size 0.195 μm, Gurley 12 s, thickness 34 μm and area weight 21.1 g/m$^2$) was solvent free coated with this mixture by the transfer roll technique. The rolls were heated up to 60° C. The lay down of Fluorolink® C—Ag at ePTFE was 4.5±0.5 g/m$^2$ after heat homogenization at 120° C., the silver concentration was found with 1.0% by weight at the surface. Results for Example 3b see Table 1.

The charge decay time measurement at low humidity indicates additional antistatic laminate properties of the antimicrobial coated article comprising the complex of an ionic fluoropolyether with silver ions.

Furthermore, the oil rating of the articles of Examples 4 and 5 shows an improved oleophobicity and, in addition, the antimicrobial coating is wash durable, as can be seen from the reduced decrease in MVTR after laundering.

The antimicrobial effect of the articles of Examples 4 and 5 is illustrated by the test results in Table 3.

Example 6

A typical weather protection laminate was fabricated. A polyamide textile was laminated to a barrier film formed from ePTFE (same as in Comparative Example 1) coated with a monolithic polyurethane layer by the lamination process of Examples 4 and 5.

The reaction product of 315 g Fluorolink® C and 35 g silver acetate (proton exchange 67%) was dissolved in 6 650 g Galden® HT 110 (Solvay Solexis) and applied to the textile side (polyamide) of the weather protection laminate by a dip coating process at 22 m/min and dried at 160° C.

The antimicrobial coated nylon laminate passed the Suter test and showed:

Oil rating on the textile side: 4
MVTR: 16 800 g/m$^2$24 h
Charge Decay Time: 4 s
Silver surface concentration at textile side: 1.3% by weight measured by EDX.

The laminate of Example 6 was washed 5 times at 60° C. After washing the MVTR was 15 500 g/m$^2$24 h. No effect on breathability was observed after washing.

After a total laundering time of 648 h, a silver concentration of 0.31% on the textile side and 0.13% on the membrane film side was found. Thus, the silver concentration dropped from 1.3% by weight to 0.31% by weight during 648 h exposure to laundering conditions. This observation indicates a very slow release of silver ions over a long period of time.

TABLE 1

| Membrane | Oil rating | EDX silver concentration [wt. %] | Agarose overlay test | MEM elution Results | MVTR [g/m$^2$ 24 h] | Gurley [s] |
|---|---|---|---|---|---|---|
| Example 1 | 1 | 1.6 | 2 | 4 | 79 000 | |
| Comparative example 1 | 0 | 0 | 0 | 0 | 80 000 | 12 |
| Example 3a | 2 | 0.74 | Not tested | Not tested | 81 300 | 12 |
| Example 3b | 2-3 | 1.02 | Not tested | Not tested | 75 300 | 22 |

Example 1 indicates that the coated substrate interacts with living cells in the agarose overlay test and MEM elution test, whereas the uncoated substrate of Comparative Example 1 does not interact with living cells.

Example 3a and 3b show an unique combination of properties for coated articles like high air permeability, improved contamination resistance and excellent breathability of the coated membranes.

Example 4 and 5

Both coated membranes of Examples 3a and 3b were laminated to a polyester textile (Flanell liner) using a gravure roll set up and an adhesive. The pressure applied at gravur and marriage nip was 340 kPa. These two laminates are those of Examples 4 and 5. In Comparative Example 2, a laminate was formed in the same way using the untreated membrane of Comparative Example 1.

Several test were performed on the laminates and the test results are shown in Table 2 and Table 3.

TABLE 2

| Laminate | Membrane | Oil rating | Charge Decay Time [s at 20% RH] | EDX silver concentration [weight %] ePTFE side | MVTR [g/m$^2$ 24 h] | MVTR [g/m$^2$ 24 h] After 5 HL |
|---|---|---|---|---|---|---|
| Example 4 | Example 3a | 2 | 0.54 | 0.69 | 20 700 | 18 800 |
| Example 5 | Example 3b | 2-3 | 0.35 | 0.71 | 20 600 | 18 600 |
| Comparative example 2 | Comparative example 1 | 0 | >> | 0 | 23 800 | 17 800 |

HL = home laundering according at 60° C.

TABLE 3

| Sample Identity | Staphylococcus aureus Zones mm | Pseudomonas aeruginosa Zones mm |
|---|---|---|
| Example 1 | 28 mm | 26 mm |
| Example 4 | 27 mm | 25 mm |
| Example 5 | 27 mm | 25 mm |
| Example 6 | Textile side down 30 mm PUR side down 32 mm | Textile side down 30 mm PUR side down 33 mm |
| ePTFE membrane | 0 | 0 |

Note:
Average size disc = 2.5 cm

Photographs of the Zones of Inhibition Bioassay plates with both *S. aureus* and *P. aeruginosa* were taken and showed clear zones of inhibition for Examples 1, 4, 5, and 6. The SEM pictures (cf. FIGS. 4 and 5) showed no bacterial biofilm on any of the materials coated with fluoropolymer—Ag.

After 5 home laundery cycles at 60° C. according ISO 6330 the laminates of Examples 4, 5 and 6 showed still activity in the ZOI test (see Table 4). No bacteria growth on the coated ePTFE side (Example 4 and 5), as well as on the PUR side (Example 6), could be reported after 24 h exposure of the material to the bacteria cultures.

TABLE 4

| Sample Identity | Staphylococcus aureus Zones mm | Pseudomonas aeruginosa Zones mm |
|---|---|---|
| Example 4 | 25 mm | 25 mm |
| Example 5 | 25 mm | 25 mm |
| Example 6 | PUR side down 25 mm | PUR side down 25 mm |
| ePTFE membrane | 0 | 0 |

The test results demonstrate the ability of the inventive compositions for inhibition the growth of various bacteria on fluoropolymers, polyurethanes and polyamides over a long time and after repeated wash cycles.

Example 7

10.0 g silver acetate (>98% pure, Merck) was added to 90.0 g Fluorolink® C (Solvay Solexis) and heated up to 90° C. under stirring until the silver acetate was reacted completely and no acetic acid was formed anymore. The proton exchange by Ag ions was 67%. An ePTFE membrane (mean flow pore size 0.178 μm, Gurley 12 s, thickness 34 μm, area weight 20.6 g/m$^2$) was solvent free coated with this mixture. The lay down of Fluorolink® C—Ag was 5.4 g/m$^2$ after heat homogenization at 150° C. The coated membrane looks slightly yellow. Oil rating was 4 on both sides, the Gurley number was 20 s.

Example 7 indicates an oleophobic antimicrobial coating on air permeable ePTFE.

Example 8

10.0 g magnesium acetate tetrahydrate (Merck) was added to 90.0 g Fluorolink® C (Solvay Solexis) and heated up to 90° C. under stirring until most of the magnesium acetate was reacted completely and no acetic acid was formed anymore. 50 g water was added to the mixture, stirred further at 90° C. and the water phase with the excess magnesium acetate was removed again. The PFPE phase was heated up to 115° C. for another 30 min. The exchange of Fluorolink® C protons by Mg$^{2+}$ ions was nearly 100%, the surface tension was 17.6 mN/m and the viscosity with 15100 mPas at 25° C.

A ePTFE membrane (same as in Example 1) was dip coated with a 1:1 mixture of PF5070 (3M) and the ionic fluoropolyether/Mg$^{2+}$ complex. The lay down at the membrane was 18.2 g/m$^2$ and the Gurley test showed no airflow (Gurley>>10 000 s). The coated side of the membrane showed an oil rating of 6, the uncoated side was rated 3 to 4 after heat homogenisation at 150° C.

Example 9

10.0 g magnesium acetate tetrahydrate (Merck) was added to 90.0 g Fluorolink® C 10 (Solvay Solexis) and heated up to 90° C. under stirring until the magnesium acetate was reacted completely and no acetic acid was formed anymore. The exchange of Fluorolink® C 10 protons by Mg$^{2+}$ ions was in the range of 86%, the surface tension 19.3 mN/m and the viscosity 5 500 mPas at 25° C.

A PTFE membrane (same as in Example 1) was dip coated in a 5% by weight mixture of the Fluorolink® C 10/Mg$^{2+}$ complex in Galden HT 110. The lay down at the coated membrane was 5.6 g/m$^2$ and the air permeability was 15 s in the Gurley test. The membrane showed an oil rating of 2.

Water wetting time of starting membrane: drop evaporates before wetting

Water wetting time of Example 9 coated membrane: <1 second 5 n KOH solution wetting time of Example 9 coated membrane: <1 second This example illustrates adding a water and/or electrolyte wetting function to an ePTFE membrane.

Example 10

5.0 g magnesium acetate tetrahydrate (Merck) was added to 95.0 g Fluorolink® C (Solvay Solexis) and heated up to 90° C. under stirring until the magnesium acetate was reacted completely and no acetic acid was formed anymore. The exchange of Fluorolink® C protons by Mg$^{2+}$ ions was in the range of 50%.

A ePTFE membrane (same as in Example 1) was dip coated with a 1:1 mixture of PF5070 (3M) and this complex of ionic fluoropolyether and Mg$^{2+}$. The lay down on the membrane was 8 g/m$^2$ and the Gurley number was 17 s. The coated side of the membrane showed an oil rating of 2. Water and 5 n KOH wet this membrane instantanously.

The membrane resistance in KOH was 50 Ohm/cm square.

This example illustrates adding a water and/or electrolyte wetting function to an ePTFE membrane which is useful as separator for battery application.

Example 11

5.0 g calcium acetate (94.3% pure, VWR) was added to 95.0 g Fluorolink® C (Solvay Solexis) and heated up to 90° C. under stirring until the calcium acetate was reacted completely and no acetic acid was formed anymore. The exchange of Fluorolink® C protons by Ca$^{2+}$ ions was approximately 65%, the viscosity 11 200 mPas and the surface tension 19.6 mN/m.

Heating up this mixture to 60° C. changes the viscosity to 1 260 mPas, the mixture penetrates into ePTFE membranes.

A ePTFE membrane (same as in Example 1) was dip coated with a 1:1 mixture of PF5070 (3M) and this complex of ionic fluoropolyether and Ca$^{2+}$. The lay down on the membrane was 8 g/m$^2$ and the Gurley number was 24 s. The coated side of the membrane showed an oil rating of 3. Water wets this membrane instantanously.

Example 12

10.0 g calcium acetate (94.3% pure, VWR) was added to 90.0 g Fluorolink® C (Solvay Solexis) and heated up to 90°

C. under stirring until the calcium acetate was reacted completely and no acetic acid was formed anymore. 50 g water was added to the mixture, stirred further at 90° C. and the water phase with the excess calcium acetate was removed again. The PFPE phase was heated up to 115° C. for another 30 min. The exchange of Fluorolink® C protons by $Ca^{2+}$ ions was approximately 100%.

A ePTFE membrane (same as in Example 1) was dip coated with a 1:1 mixture of PF5070 (3M) and this complex of ionic fluoropolyether and $Ca^{2+}$. The lay down on the membrane was 8 g/m² and the Gurley number was 34 s. The coated side of the membrane showed an oil rating of 4. Water and 5 n KOH wet this membrane instantanously. The membrane resistance in KOH was 3 Ohm cm square.

Example 13

A complex of Fluorolink® C 10 and $Ca^{2+}$ was prepared by reacting 95.0 g Fluorolink® C 10 and 5 g calcium acetate according to Example 11 (Example 13 a).

In addition, a complex of Fluorolink® C 10 and $Ca^{2+}$ was prepared by reacting 90.0 g Fluorolink® C 10 and 10 g calcium acetate according to Example 11 (Example 13b).

For results see Table 5.

Example 14

A complex of Fluorolink® C 10 and $K^+$ was prepared by reacting 90.0 g Fluorolink® C 10 and 10 g potassium acetate (>99.0%, Merck) according to Example 11. For results see Table 5.

Example 15

A complex of Fluorolink® C 10 and $Zn^{2+}$ was prepared by reacting 90.0 g Fluorolink® C 10 and 10 g zinc acetate dihydrate (>99.0%, Merck) according to Example 11. For results see Table 5.

TABLE 5

| Sample | H+ exchange [%] | Viscosity at 60° C. [mPas] | Surface tension [mN/m] | Counter-ionic agent |
|---|---|---|---|---|
| 13a | 50 | 420 | 19.4 | $Ca^{2+}$ |
| 13b | 100 | 4 330 | 16.4 | $Ca^{2+}$ |
| 14 | 89 | 150 | 15.7 | $K^+$ |
| 15 | 74 | 390 | 22.4 | $Zn^{2+}$ |

A ePTFE membrane (mean flow pore size 0.180 μm, Gurley 13 s, thickness 34 μm, area weight 18 g/m²) coated with 13b out of a 5% by weight solution in Golden® HT 110 (Solvay Solexis) showed the following characteristics:

Lay down: 6.2 g/m², Gurley: 15 s, oil rating: 5 to 6, water wettability: <1 s, wettability against 5 n KOH<1 s.

Examples 11 to 15 illustrate adding a water and/or electrolyte wetting function to an ePTFE membrane by different counter-ionic agents and ionic fluoropolyether formulations for a variety of ePTFE structures. These materials can be expected to be useful in microfiltration applications.

Example 16

10.0 g copper acetate (>98.0%, Fluka) was added to 90.0 g Fluorolink® C 10 (Solvay Solexis) and heated up to 110° C. under stirring until the copper acetate was reacted completely and no acetic acid was formed anymore. A dark green highly viscous liquid was obtained with a proton exchange of 98%.

A ePTFE membrane (same as in Example 1) was dip coated with a 5% by weight solution of the Fluorolink®/copper complex in isopropyl alcohol at 50° C. The lay down at the membrane was 7 g/m² and the Gurley number was 11 s. The coated side of the membrane showed an oil rating of 3. Water wets this membrane instantaneously.

Examples 15 and 16 show the incorporation of antimicrobially active $Zn^{2+}$ and $Cu^{2+}$ ions into a fluoropolyether complex at ePTFE surfaces.

Example 17

An ePTFE membrane (mean flow pore size 0.343 μm, Gurley 19 s, thickness 86 μm, area weight 55.6 g/m²) was solvent free coated with Fluorolink® C in a transfer process at 65° C. The coated web was heat homogenisized in an oven at 165° C. The lay down at the membrane was 3-4 g/m² and the Gurley number was 12.0 s.

99.1 g Clevios™ PH (former Baytron® PH, solid content 1.3% by weight of the intrinsically conductive polymer PEDT/PSS [poly(3,4-ethylenedioxythiophene)polystyrene sulfonate)] dispersed in water, mean swollen particle size d50 about 30 nm, product information brochure, available from H.C. Starck) was mixed with 99.1 g ethanol for 30 min. The Fluorolink® C coated membrane was dip coated with this solution for 30 s and dried at 170° C. for 5 min. Surface resistance of the blue colored membrane at both sides was 1.3×106 Ohm/square at room temperature. The lay down was 0.5 g/m², the membrane is air permeable and showed a Gurley number of 12.4 s.

Example 17 illustrates an antistatic coating on ePTFE. The coating of Example 17 is coloured, as is the coating of Example 16.

Example 18

2.5 g Cresyl Violett acetate (Fluka) was added to 97.5 g Fluorolink® C 10 (Solvay Solexis) at 110° C. under stirring for 30 min. The liquid turned to a violet colour rapidly.

A ePTFE membrane (same as in Example 1) was dip coated with a 5% by weight solution of mixture in isopropyl alcohol at 50° C. The laydown at the membrane was 4 g/m² and the Gurley number was 11 s. The membrane was colored and contains a biological active material.

Example 19

The coating formulation according to Example 9 (Fluorolink® C 10 and Mg ions) was applied as a 5 weight % solution in Galden® HT 110 (Solvay Solexis) on an ultra high molecular weight (UHMW) PE membrane (mean flow pore size 0.470 μm, Gurley 47 s, thickness 52 μm, area weight 16 g/m²). After drying at 90° C. a lay down of 8 g/m² was measured, the coated membrane was instantaneously water wettable.

Example 19 indicates adding a water wetting function to a microporous polyethylene membrane.

Comparative Example 3

An ePTFE membrane (mean flow pore size 0.490 μm, Gurley 8 s, thickness 75 μm, area weight 36.8 g/m²) was coated just with Fluorolink® C via a kiss roll process. The roll temperature was kept at 60° C. The lay down was 3 g/m² after heat homogenization at 130° C.

Oil rating measurements at the coated surface are reported in Table 6.

TABLE 6

Oil rating measuremants and wettability results

| Sample Identity | Oil rating | Water wetability [s] |
|---|---|---|
| Comparative Example 3 | 0 | >120 s |
| ePTFE membrane used to make Comparative Example 3 | 0 | >> |
| Example 12 | 4 | 0-1 |

Comparative Example 3 indicates poor oil rating performance and slow water wettability for the use of ionic fluoropolyether in absence of a counter ionic agent.

The invention claimed is:

1. An article comprising a polymeric substrate and a coating thereon,
   the coating comprising a complex of an ionic perfluoropolyether and a counter-ionic agent wherein the counter-ionic agent comprises surface charged nanoparticles of intrinsically conductive polymers having a particle size from 5 nm to 500 nm dispersed in a liquid,
   wherein the counter-ionic agent further comprises an ion bearing an ionic charge opposite to the charge of the ionic groups of the ionic perfluoropolyether with the exception of H+ and Na+,
   wherein the coating is present as monolithic layer on a surface of the substrate, said coating having a thickness from 0.05 micrometers to 25 micrometers, and
   wherein the F/H ratio of the ionic perfluoropolyether is equal to or greater than 1,
   wherein the ionic groups of the ionic perfluoropolyether are anionic groups selected from the groups consisting of carboxylic, phosphoric, and sulphonic groups and mixtures thereof,
   wherein an equivalent weight of the ionic perfluoropolyether is in the range of 8000 to 15000 g/mol.

2. The article according to claim 1, wherein the substrate is a microporous substrate.

3. The article according to claim 1, wherein the substrate is a porous substrate selected from the group consisting of polytetrafluoroethylene (PTFE), a modified PTFE, a fluorothermoplastic, a fluoroelastomer and any combination thereof.

4. The article according to claim 1, wherein the substrate is porous polytetrafluoroethylene (PTFE).

5. The article according to claim 1, wherein the substrate is expanded polytetrafluoroethylene (ePTFE).

6. The article according to claim 1, wherein in the complex, 5 to 100 percent of the ionic charges of the ionic perfluoropolyether is balanced by the ionic charges of the counter-ionic agent.

7. The article according to claim 1, wherein the ion of the counter-ionic agent is selected from the group consisting of an organic ion and a non-alkali metal ion.

8. The article according to claim 1, wherein the coating is applied in liquid form to the substrate.

9. The article according to claim 8 wherein the liquid used for coating the substrate has a surface tension of less than 35 mN/m.

10. The article according to claim 1, wherein the coating is present on an inner and an outer surface of the pores.

11. The article according to claim 10, wherein the thickness of the coating present on the inner and outer surface of the pores is above 10 nanometers.

12. The article according to claim 10, wherein the pores of the substrate are not entirely filled with the coating.

13. The article according to claim 1, wherein the coated article has a charge decay time at 20 percent relative humidity of less than 2 seconds.

* * * * *

UNITED STATES PATENT AND TRADEMARK OFFICE
CERTIFICATE OF CORRECTION

PATENT NO. : 8,951,628 B2
APPLICATION NO. : 13/054101
DATED : February 10, 2015
INVENTOR(S) : Wolfgang Burger and Rudolf Steffl It is certified that error appears in the above-identified patent and that said Letters Patent is hereby corrected as shown below:

In the Specification

At column 6, line 52: change "$-CF_2R_6R_6=H$, Cl, BR, or I" to
-- $-CF_2R_6$ where $R_6 = H$, Cl, BR, or I --

At column 6, line 56: change "$-CFR_7-CF_3R_7=H$, Cl, Br, or I" to
-- $-CFR_7-CF_3$ where $R_7 = H$, Cl, Br, or I --

At column 7, line 5: change "$-OC_9F_{16}I$" to -- $-OC_9F_{18}I$ --

At column 7, line 12: change "$-OC_6F_{15}Cl_2$" to -- $-OC_8F_{15}Cl_2$ --

At column 7, line 23: change "$-C_5F_{16}H$" to -- $-C_8F_{16}H$ --

At column 17, line 46: change "suture garn" to -- sutures --

Signed and Sealed this
Nineteenth Day of May, 2015

Michelle K. Lee
*Director of the United States Patent and Trademark Office*